United States Patent
Collier et al.

(10) Patent No.: US 11,509,649 B2
(45) Date of Patent: Nov. 22, 2022

(54) EXCLUSIVE SELF-ESCROW METHOD AND APPARATUS

(71) Applicant: Oboren Systems, Inc., Berkeley, CA (US)

(72) Inventors: James C. Collier, Oakland, CA (US); Michael Pompa, Oakland, CA (US)

(73) Assignee: Oboren Systems, inc., Berkeley, CA (US)

( * ) Notice: Subject to any disclaimer, the term of this patent is extended or adjusted under 35 U.S.C. 154(b) by 0 days.

(21) Appl. No.: 17/490,026

(22) Filed: Sep. 30, 2021

(65) Prior Publication Data

US 2022/0109666 A1    Apr. 7, 2022

Related U.S. Application Data

(60) Provisional application No. 63/167,974, filed on Mar. 30, 2021, provisional application No. 63/086,373, filed on Oct. 1, 2020.

(51) Int. Cl.
| | | |
|---|---|---|
| H04L 9/32 | (2006.01) | |
| H04L 9/14 | (2006.01) | |
| G06F 21/40 | (2013.01) | |
| H04L 9/40 | (2022.01) | |

(52) U.S. Cl.
CPC .............. H04L 63/083 (2013.01); H04L 9/14 (2013.01); H04L 9/3242 (2013.01)

(58) Field of Classification Search
CPC ........ H04L 63/083; H04L 9/14; H04L 9/3242
USPC ........................................................ 713/168
See application file for complete search history.

(56) References Cited

U.S. PATENT DOCUMENTS

| | | | | |
|---|---|---|---|---|
| 2002/0065866 A1* | 5/2002 | Sueyoshi | .............. | G06F 21/445 719/310 |
| 2005/0018840 A1* | 1/2005 | Yung | .................... | H04L 9/0838 380/28 |
| 2009/0292920 A1* | 11/2009 | Willey | .................. | H04W 12/50 713/168 |
| 2010/0042838 A1* | 2/2010 | Ho | ........................ | H04L 9/0844 713/169 |
| 2011/0138176 A1* | 6/2011 | Mansour | ............... | H04L 9/3231 713/168 |
| 2017/0010459 A1 | 1/2017 | Sawai | | |
| 2017/0019383 A1 | 1/2017 | Sauderwald et al. | | |

(Continued)

OTHER PUBLICATIONS

The comparisons between public key and symmetric key cryptography in protecting storage systems, Chen et al., Oct. 2010 (Year: 2010).*

(Continued)

*Primary Examiner* — Jahangir Kabir
(74) *Attorney, Agent, or Firm* — Steven R. Vosen

(57) ABSTRACT

A method and apparatus provides for securely unlocking a locked program domain by a third party wishing to gain extraordinary access to the program domain by a third party. The third party and the program domain are mutually authenticated using exclusive self-escrow of credentials that are generated, revealed, or stored within the program domain. Multiple third parties that are required for unlocking the program domain may also be authenticated prior to unlocking the program domain. The method and apparatus provides extraordinary access without the use of backdoors or having the program domain provide credentials to third parties.

30 Claims, 17 Drawing Sheets

(56) References Cited

U.S. PATENT DOCUMENTS

2019/0109857 A1    4/2019   Caffary, Jr.
2020/0226243 A1    7/2020   Manduley et al.

OTHER PUBLICATIONS

Search Report for related patent application PCT/US2021/052802 (dated Dec. 28, 2021).

Abelson et al. The risks of key recovery, key escrow, and trusted third-party encryption. May 27, 1997 (May 27, 1997). [retrieved on Dec. 10, 2021]. Retrieved from the Internet: <URL: https://dspace.mit.edubitstream/handle/1721.1/117329/paper-key-escrow.pdf?sequence=1&isAllowed=y> pp. 1-20.

Savage. Lawful Device Access without Mass Surveillance Risk: A Technical Design Discussion. Oct. 15, 2018 (Oct. 15, 2018). [retrieved on Dec. 10, 2021}. Retrieved from the Internet: <URL: https:/fdl.acm.org/doi/pdf/10.1145/3243734 .3243758> pp. 1761-1774.

\* cited by examiner

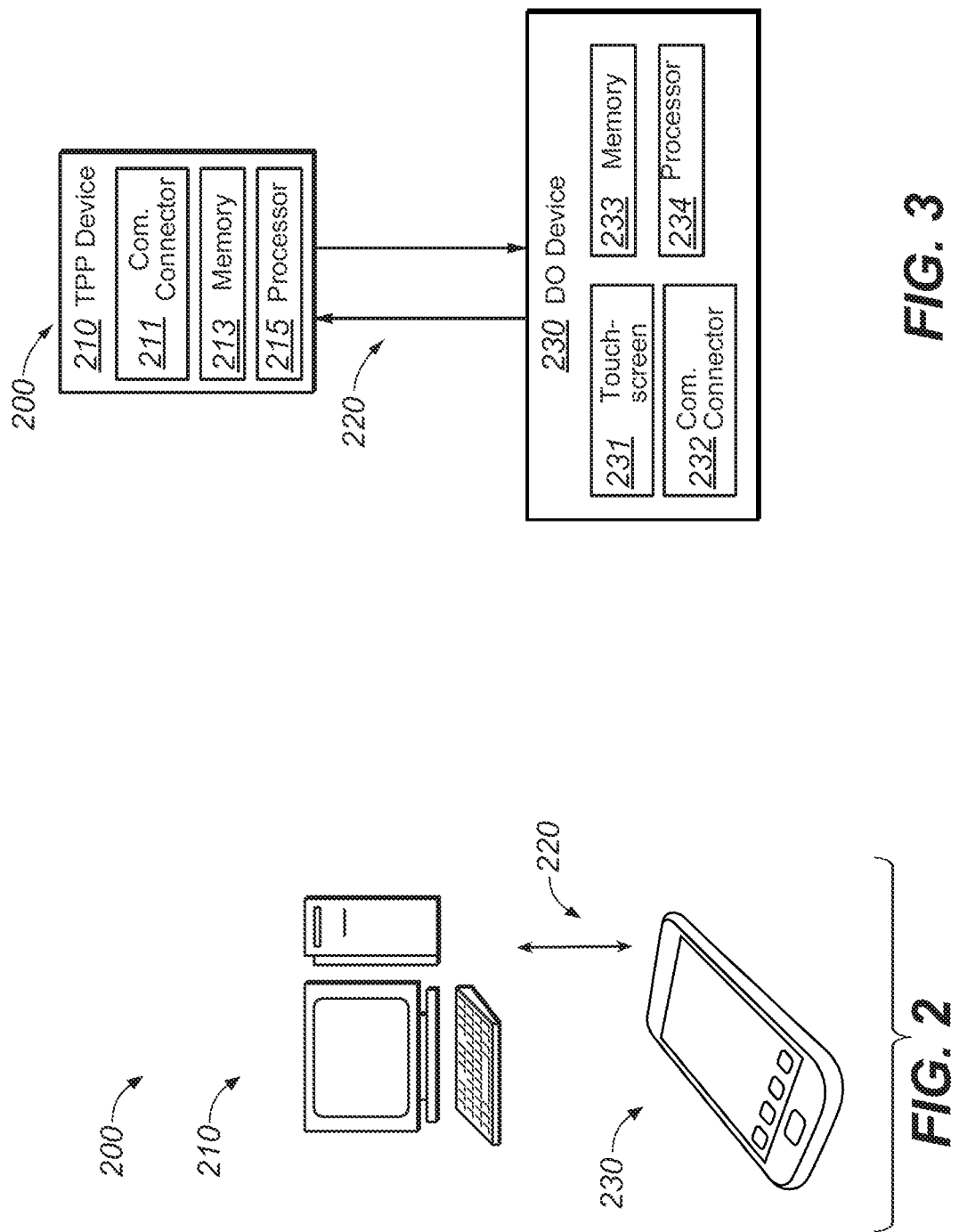

FIG. 18

| E | HW/HSA | MSG # | METHOD OF ENCRYPTION | | | A. CREDENTIAL AUTHENTICATION | | B. CREDENTIAL AUTHENTICATION | | |
|---|---|---|---|---|---|---|---|---|---|---|
| | | | PKE | SKE | # | E PASSCODE/H | SSK/HSSK | RND/HRND/f(x) | DEVICE ID | TIME STAMP |
| I. | ✓ | (5) | (3) | — | (3) | ✓/— | —/— | ✓/—/— | — | — |
| II. | — | (5) | (2) | (3) | (5) | ✓/— | —/✓ | —/—/— | — | ✓ |
| III. | ✓ | (3) | (3) | (2) | (5) | ✓/— | —/✓ | ✓/—/— | ✓ | — |
| IV. | — | (4) | (2) | (4) | (6) | ✓/— | —/✓ | ✓/—/— | ✓ | — |
| V. | — | (7) | (2) | (5) | (7) | —/— | —/✓ | ✓/—/— | — | — |
| VI. | — | (2) | (2) | (4) | (4) | —/— | —/✓ | ✓/✓/— | — | — |
| VII. | — | (3) | (2) | (2) | (4) | —/— | ✓/— | —/—/— | — | ✓ |
| VIII. | — | (3) | (2) | (3) | (5) | ✓/✓ | —/— | ✓/✓/— | — | — |
| IX. | — | (3) | — | (2) | (2) | ✓/✓ | —/— | ✓/✓/— | — | — |
| X. | — | (3) | (3) | — | (3) | ✓/— | —/— | ✓/—/✓ | — | — |
| XI. | — | (2) | (2) | (2) | (2) | ✓/✓ | —/— | ✓/—/✓ | — | — |
| XII. | — | (3) | (1) | (1) | (1) | ✓/✓ | —/— | ✓/—/✓ | — | — |
| XIII. | — | (3) | (1) | (1) | (1) | ✓/— | —/— | ✓/—/✓ | — | — |
| XIV. | — | (1) | (1) | — | (1) | —/— | —/— | ✓/—/✓ | — | — |

E: Embodiment
HW: Hardware
HSA: Hardware Secure Area
MSG: Message Container
: Quantity
—: none
(check): included
T: Key Pairs PKE: Public Key Encryption (Key Pair)
SKE: Symmetric Key Encryption (Key Pair)
EPasscode/H: Escrow Passcode/Hashed Escrow Passcode
SSK/HSSK: Shared-Secret Key/Hashed Shared-Secret Key
RND/HRND: Random Number/Hashed Random Number
f(x): Random Number Function
Device ID: Device Identifier
Time Stamp: Date-Time-of-Day

EXCLUSIVE SELF-ESCROW METHOD AND APPARATUS

CROSS-REFERENCE TO RELATED APPLICATIONS

This application claims the benefit of U.S. Provisional Application No. 63/086,373, filed Oct. 1, 2020 and U.S. Provisional Application No. 63/167,974 filed Mar. 30, 2021, the contents of which are hereby incorporated by reference in their entirety

BACKGROUND OF THE INVENTION

Field of the Invention

The present invention generally relates to securing program domains, and more particularly to a method and apparatus for securely unlocking a program domain by exclusive self-escrow.

Discussion of the Background

Electronic devices and computer programs may restrict access by requiring a user-supplied credential to obtain access. Thus, for example, smartphones may be locked and require a user supplied credential such as a passcode, thumbprint, or image of a face to unlock the phone, and computer programs or files may also require a user supplied credential to obtain access.

Occasionally, someone other than the user requires exceptional access (that is, without a user supplied credential) to the electronic device, program, or file, which are referred to herein without limitation as a program domain. Thus, for example, there have been many instances of US government authorities requesting access to a smartphone by the use of a search warrant. If the user refuses to provide the credential then other means must be used to provide exceptional access to the smartphone.

One prior art method of gaining extraordinary access to encrypted data, and which may also be used to unlock a smartphone or other program domain, is by the use of a secret backdoor mechanism, wherein the program domain accepts an unlock request established by a third party without the knowledge or participation of the owner. Backdoors are problematic, by their nature, as unauthorized reductions of the owner's security. Their unauthorized placement within the program domain guarantees that both the user of the backdoor, including any passcode required by that backdoor, and its use is not authorized by the owner. Further, since backdoor passcodes, or other operational data, are stored in an external database such backdoors are susceptible to hacking, theft, and misuse.

Another prior art method of providing extraordinary access to a program domain is by "key escrow," in which the keys (credentials) needed for unlocking the program domain are held in escrow by a third party, sometimes referred to as a trusted third party. They are designated trusted because the domain owner does not hold an enforceable agreement governing the actions of the third party, and the credentials held. These third parties may include businesses, who may want access to employees' secure business-related communications, or governments, who may wish to be able to view the contents of encrypted communications (also known as exceptional access) without adhering to privacy rights and due process.

One technical problem with using key escrow is that access to protected information must be provided only to the intended recipient and at least one intended third party. The third party should be permitted access only under carefully controlled conditions, as for instance, a court order. Thus far, no prior art system has been shown to meet this requirement. All proposed systems also require correct functioning of some social-judicial-linkage, as for instance, the process of request for access, examination of the requestors and request for "legitimacy" (as by a court), and granting of access by third-party technical and government authority personnel charged with access control. All such linkages/controls have serious problems from a system design security perspective. Systems in which a single key unlocks many program domains are rendered especially vulnerable as the accidental release of the key will result in many devices becoming totally compromised, necessitating an immediate key change or replacement of the system.

On a national level, key escrow is controversial in many countries for at least two reasons. One involves mistrust of the security of the structural escrow arrangement. Many countries have a long history of less than adequate protection of privacy and afforded due-process rights regarding others' information by assorted organizations, public and private, even when the information is held only under an affirmative legal obligation to protect it from unauthorized access. Another is technical concerns for the additional vulnerabilities likely to be introduced by supporting key escrow operations. Thus far, no key escrow system has been designed which meets both objections and nearly all have failed to meet even one objective.

Key escrow is proactive, anticipating the need for access to keys; a retroactive alternative is key disclosure law, where users are required to surrender keys/passcodes upon demand by law enforcement, or else face legal penalties. Key disclosure law avoids some of the technical issues and risks of key escrow systems, but also introduces new risks like loss of keys and legal issues such as involuntary self-incrimination.

In summary, while key escrow systems can attempt to provide adequate security, there are several flaws in such systems. First, key escrow systems require the use of a central database containing multiple billions of passcodes for billions of program domains, which may be compromised by hackers, or seized by government authorities. Second, key escrow systems require that trusted third-parties uphold their the oath to be a trustworthy steward and intermediary. Third, key escrow systems to not ensure that government authorities honestly administration laws and their own charters, separate and apart from the trustworthiness of the trusted third-party.

While the use of prior art methods and apparatus initially presented as easy to use and fairly secure, these benefits have proven elusive in practice, and there is a need in the art to provide methods and systems that provide improved security. Specifically, such a system and method should provide that extraordinary access to a program domain occurs only by authorized parties with authorized direction. Such methods and apparatus should be easy to implement and robust to prevent against actors attempting to illegally gain access to a locked program domain.

BRIEF SUMMARY OF THE INVENTION

The present invention overcomes the disadvantages of prior art by a system or method of security that establishes that any third-party attempting to unlock a program domain is authorized to do so, and any attempt at unlocking, successful or not, is preserved for the owner/estate.

Certain embodiments provide a method for a third party (TP) having a TP domain to unlock a locked device owner's program domain (DO-PD). The method includes: a first authenticating of the DO-PD by the TP domain; a second authenticating of the TP domain by the DO-PD; and unlocking the locked DO-PD after the successful first authenticating and the successful second authenticating. Various embodiments provide that: the first authenticating or the second authenticating includes exchanging messages between the DO-PD and the TP domain, where the messages is a credential or includes a credential; that the TP domain includes a first subdomain contained within the DO-PD (TP-PD) and subdomain which is not within the DO-PD (TP-'PD); that the DO-PD is a horizontal program domain; that the DO-PD is within an electronic device, which may be a smartphone or a computer or a tablet; that the DO-PD is a vertical program domain; that the DO-PD contains a database, a word processor, a spreadsheet, a bitcoin wallet, or a mobile lockbox; that the TP is a first TP having a first TP domain, where the method further includes a second TP having a second TP domain; or that the first authenticating of the DO-PD by the TP domain and the second authenticating of the TP domain by the DO-PD are mutual authentication using exclusive self-escrow.

Certain other embodiments provide a method for a third party (TP) having a TP domain to unlock a locked device owner's program domain (DO-PD). The method includes: a first authenticating of the DO-PD by the TP domain; a second authenticating of the TP domain by the DO-PD; and unlocking the locked DO-PD after the successful first authenticating and the successful second authenticating. The first authenticating of the DO-PD by the TP domain is successful when a first credential is equal to second credential, the second authenticating is successful when a third credential is equal to a fourth credential, and where at least one of the four credentials is generated, revealed, or stored in the DO-PD Various embodiments provide that: the first credential and the third credential are resident credentials, and that the second credential and the fourth credential are challenge credentials; that the first credential and the second credential are both revealed or computed during the first authenticating, and that the third credential and the fourth credential are both revealed or computed during second authenticating.

Yet other embodiments provide a method for a third party (TP) having a TP domain to unlock a locked device owner's program domain (DO-PD) that authenticates using credentials including at least one of a passcode, a random number, a device ID of the electronic device credential, a shared secret key of the PD and the TP domain, an encrypted passcode, an encrypted random number, an encrypted device ID of the electronic device credential, an encrypted shared secret key of the PD and the TP domain, a passcode, a random number, a device ID of the electronic device credential, a shared secret key of the PD and the TP domain, a hashed passcode, a hashed random number, a hashed device ID of the electronic device credential, or a hashed shared secret key of the PD and the TP domain.

Other certain embodiments provide a method for a third party (TP) having a TP domain to unlock a locked device owner's program domain (DO-PD) that authenticates using credentials where at least one credential is revealed or generated using at least one key of a TP key pair, one key of a PD key pair, or a shared secret key.

Certain embodiments provide a method for a third party (TP) having a TP domain to unlock a locked device owner's program domain (DO-PD), where authentication of an additional third party is required to unlock the DO-PD.

Certain embodiments provide an apparatus for a third party (TP) having a TP domain to unlock a locked device owner's program domain (DO-PD), where the DO-PD has a memory and is programmed to perform the steps of: a first authenticating of the DO-PD by the TP domain; a second authenticating of the TP domain by the DO-PD; and unlocking the locked DO-PD after the successful first authenticating and the successful second authenticating. Various embodiments provide that: the first authenticating or the second authenticating includes exchanging messages between the DO-PD and the TP domain, where the message is a credential or includes a credential; that the TP domain includes is a first subdomain contained within the DO-PD (TP-PD) and subdomain which is not within the DO-PD (TP-'PD); that the DO-PD is a horizontal program domain; that the DO-PD is within an electronic device, which may be a smartphone or a computer or a tablet; that the DO-PD is a vertical program domain; that the DO-PD contains a database, a word processor, a spreadsheet, a bitcoin wallet, or a mobile lockbox; that the TP is a first TP having a first TP domain, where the method further includes a second TP having a second TP domain; or that the first authenticating of the DO-PD by the TP domain and the second authenticating of the TP domain by the DO-PD are mutual authentication using exclusive self-escrow.

Certain other embodiments provide an apparatus for a third party (TP) having a TP domain to unlock a locked device owner's program domain (DO-PD), where the DO-PD has a memory and is programmed to perform the steps of: a first authenticating of the DO-PD by the TP domain; a second authenticating of the TP domain by the DO-PD; and unlocking the locked DO-PD after the successful first authenticating and the successful second authenticating. The first authenticating of the DO-PD by the TP domain is successful when a first credential is equal to second credential, the second authenticating is successful when a third credential is equal to a fourth credential, and at least one credential of four credentials is generated, revealed, or stored in the DO-PD. Various embodiments provide that: the first credential and the third credential are resident credentials, and that the second credential and the fourth credential are challenge credentials; that the first credential and the second credential are both revealed or computed during the first authenticating, and that the third credential and the fourth credential are both revealed or computed during second authenticating.

Yet other embodiments provide an apparatus for a third party (TP) having a TP domain to unlock a locked device owner's program domain (DO-PD) that authenticates using credentials including at least one of a passcode, a random number, a device ID of the electronic device credential, a shared secret key of the PD and the TP domain, an encrypted passcode, an encrypted random number, an encrypted device ID of the electronic device credential, an encrypted shared secret key of the PD and the TP domain, a passcode, a random number, a device ID of the electronic device credential, a shared secret key of the PD and the TP domain, a hashed passcode, a hashed random number, a hashed device ID of the electronic device credential, or a hashed shared secret key of the PD and the TP domain.

Other certain embodiments provide an apparatus for a third party (TP) having a TP domain to unlock a locked device owner's program domain (DO-PD) that authenticates using credentials where at least one credential is revealed or generated using at least one key of a TP key pair, one key of a PD key pair, or a shared secret key.

Certain embodiments provide an apparatus for a third party (TP) having a TP domain to unlock a locked device owner's program domain (DO-PD), where the DO-PD has a memory and is programmed to perform the steps of authentication of an additional third party to unlock the DO-PD.

These features together with the various ancillary provisions and features which will become apparent to those skilled in the art from the following detailed description, are attained by the method and apparatus of the present invention, preferred embodiments thereof being shown with reference to the accompanying drawings, by way of example only, wherein:

BRIEF DESCRIPTION OF THE SEVERAL VIEWS OF THE DRAWING

FIGS. 2 and 3 are schematic diagrams which illustrate one embodiment of a system for executing the steps of the schematic of FIG. 1;

FIG. 18 is a table showing some features of the fourteen embodiments.

Figure 1:
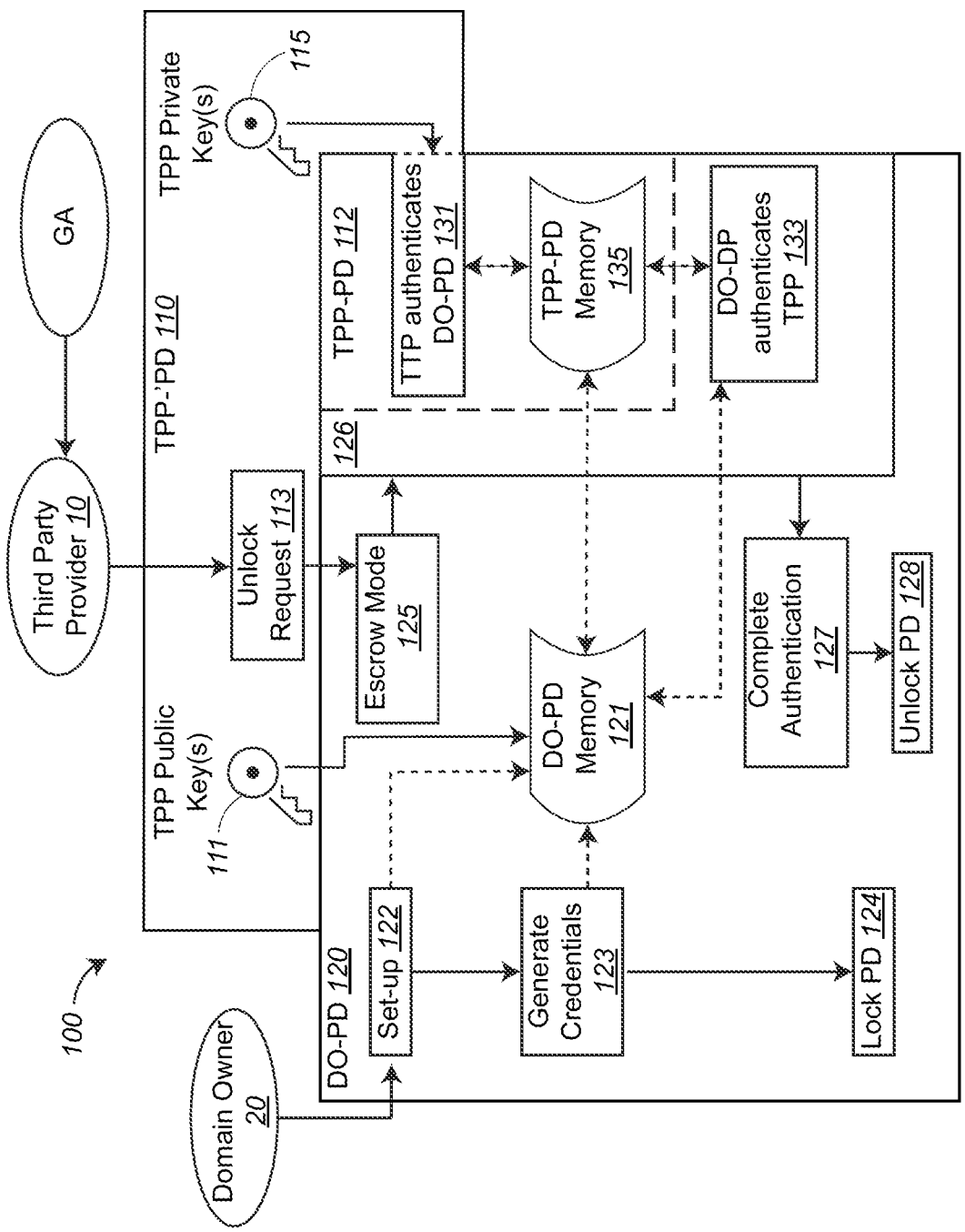
FIG. 1 is a schematic of one implementation of an exclusive self-escrow method, which illustrates the device owner's program domain, DO-PD and the third-party provider domain, TPP.

Reference symbols are used in the Figures to indicate certain components, aspects or features shown therein, with reference symbols common to more than one Figure indicating like components, aspects or features shown therein.

DETAILED DESCRIPTION OF THE INVENTION

Various embodiments described herein are directed to a third party gaining extraordinary access to a locked program domain by mutual authentication using exclusive self-escrow. Mutual authentication refers to multiple step authentication, wherein the various parties authenticate one to the other. Exclusive self-escrow refers to the use of credentials that are held within the locked program domain. Thus, for example, using credentials that are stored in a locked program domain, the third party authenticates themself to the locked program domain and the locked program domain authenticates the third party. After the mutual authentication, the third party is granted access to the formerly locked program domain.

Mutual authentication using exclusive self-escrow provides an on-device escrow capability, as opposed to using central, off-device storage, which ensures that the credentials are neither stolen, via central database hacking, or misdirected willfully or through coercion by a third party in concert with a government authority, alone, or with any other outside party. The methods and systems described provides for exceptional access to a locked program domain on a per-device basis, and provides no mechanism for any form of mass-surveillance. As a further protection against mass surveillance, certain embodiments provide that third parties are not provided with notification of the escrow credential's creation, existence, or identifying information, at the time a normal passcode is installed, and the third party remains unaware, until such time as the third party is engaged by a government agency, or other investigative authority with standing, in possession of a locked device, which may, only then, reveal the ability of the TPP to execute an exceptional access for the device In general, each of the authentications requires a comparator step, in which a pair of credentials are compared where authentication occurs when the credentials are found to be equal to each other. The credentials are, referred to herein and without limitation, referred to as a resident credential and a challenge credential. The term "resident credential" refers to a standard copy of the credential that is held by the authenticating party and the term "challenge credential" refers to a work-being-measured copy of the credential that is revealed or computed by the authenticator, after being presented by the party being authenticated. The comparator step thus determines, for each authenticating party, if the challenge credential is the same as the resident credential, which is trusted by the authenticating party. In certain embodiments, the pair of credentials are initialized or computed to initially be identical and undergo encryption/decryption steps, after which the pair of credentials will be identical only if the correct keys have been used during the initialization, computation, or encryption/decryption steps.

Exclusive self-escrow methods may utilize combinations of different messages (access data) and content, encryption methods (asymmetric and symmetric), and one-way function credential types, to accomplish authentication of the program domain and the third-party(s). Whereas public key encryption provides a means for protecting authenticating one-way function credentials, symmetric encryption provides for both producing and protecting one-way function credentials for bi-directional authentication. Each type of credential exhibits a unique functional character that supports its role in authentication, with a focus on one-way functionality and state expression. The HSA (hardware secure area), on certain devices, can substitute for an encrypted message.

Exclusive self-escrow may, in certain embodiments, utilize one or more encryption key pairs, or shared secret-keys, and mutually authenticates the various parties using credentials that include, but are not limited to, encrypted messages, hashed-key and/or random numbers, device IDs and time stamps. The exclusive self-escrow methods described herein may be used with horizontal program domains and vertical program domains. Horizontal domains specify classes of contents that reach across different applications, and often pertain to an entire device, location, or operating system. An example of a horizontal program domain is a smartphone running iOS. Vertical domains specify content particular to a vertical application, such as a database, a word processor, a spreadsheet, a bitcoin wallet, or a mobile lockbox. Vertical domains are often sub-domains of horizontal domains, in the case of an address book application running on an Android OS device. Of note, security operations can be performed upon a sub-domain in addition to operations performed on the domain containing the sub-domain. Critically, the sub-domain may remain locked while its parental domain is transformed from locked to unlocked.

By way of example, which is not meant to limit the scope of the present invention, the invention is described herein in terms of a third party provider (TPP) gain access to a locked program domain (PD) having an associated domain owner (DO), and which is referred to herein as a DO-PD. The DO-PD is under control under a program, P, and may also include associated hardware, such as and not limited to a smartphone, tablet, or other computer device, or a portion of computer memory or a computer file. The TPP is a party other than the DO which may be, for example and without limitation, the manufacturer of a PD and/or any associated hardware. The TPP has two associated domains. One TPP domain separate from the DO-PD and is referred to herein as TPP-'PD (TPP not PD), and another TPP domain is a cryptographically partitioned portion of the DO-PD under the control of the DO-PD program, P, referred to herein as TPP-PD. Actions within TPP-PD are limited, and include receiving data from the DO-PD, computing additional data using available data, and sending data to the DO-PD.

Certain embodiments provide for unlocking a PD using exclusive self-escrow, in which the credentials for unlocking the PD are: 1) stored and/or computed in the PD; 2) used within the PD to authenticate the TPP; and 3) used by the TPP to authenticate the PD. In certain other embodiments, the authenticating steps includes a two-way authentication process, in which there is an exchange and comparison of messages between the third party provider and program domain.

FIG. 1 is a schematic 100 of one implementation of an exclusive self-escrow method, which illustrates a domain-owner program domain, DO-PD 120, a first third-party provider domain, TTP-'PD 110, and a second third-party provider domain, TPP-PD 112. DO-PD 120 is under the control of DO 20 via a program, P, TTP-'PD 110 is under the control of a TPP 10 and is outside of and secure to any programming in the DO-PD, and TPP-PD 112 is a domain that is a cryptographically partitioned portion of the DO-PD and which has limited capabilities including receiving data from the DO-PD, computing additional data using available data, and sending data to the DO-PD. Thus, for example, FIG. 1 illustrates a DO-PD memory 121 that includes volatile and non-volatile memory that is accessible from the DO-PD, and a TPP-PD memory 135 that includes volatile and non-volatile memory that is accessible from the TPP-PD 112. In general, information stored within TPP-PD memory 135 is not accessible to DO-PD 120. Thus, for example, TPP 110 may provide a copy of TPP private key(s) 115 to TPP-PD memory 135. While TPP-PD memory 135 is within DO-PD 120, the DO-PD does not have access to the TPP private key(s).

FIG. 1 illustrates the use of two-way authentication by the mere possession of unique credentials that are stored in DO-PD memory 121. Alternatively, authentication is performed by both possession and computation of credentials, in which unlocking the program domain proves the authentic identity of both the PD and the TPP via comparing credentials emanating from the possession and computational application of the wholly-owned private keys that each party possesses, from the time the device program domain is initially locked. In certain embodiments, the computation of credential includes the use of one-way mathematical functions which precludes the reverse-engineering of the credential into its pre-cursor value, in polynomial time. A significant benefit of the computation method is that the hash-values can be stored and exchanged between the parties in the open, not requiring the privacy effort and protection of encryption.

Schematic 100 illustrates methods for both DO 20 to set up the locking of DO-PD 120 and for TPP 10 to unlock a locked DO-PD. In one initial step, TTP-'PD 110 obtains or generates a key pair, such as a TPP public key 111 and a TPP private key 115. In one embodiment, keys 111 and 115 may be, for example and without limitation, a public key pair as is known it the art. In alternative embodiments, TPP key pair 111/115 may accompanied by an additional key utilized in symmetric encryption.

To lock DO-PD 120, DO 20 engages with DO-PD 120 at block 122, which sets up the DO-PD for self-escrow locking. This may include the generation of PD key pairs, which may include, for example and without limitation, a public key pair including a PD private key and a PD public key and additional symmetric key pairs, which are used to generate one or more shared secret keys (referred to herein as SSKs) which are stored in the non-volatile memory DO-PD memory 121. Alternatively, the DO-PD may generate and store the PD keys before the steps of block 122 are performed, or block 122 may be executed while the program domain owner is setting up a normal passcode for locking DO-PD 120. Further, TPP public key(s) 111 are provided to DO-PD 120 and are also stored in DO-PD memory 121. In certain other embodiments, the generation of keys may occur during unlocking of DO-PD 120 and before they are required for authentication.

Once DO-PD 120 is locked, the DO-PD operates under the control of a program P, which controls the third-party unlocking of the DO-PD as described subsequently. In addition, DO-PD 120 may also execute programming to normally unlock the DO-PD, such as by a passcode.

In the step of block 123, exclusive self-escrow credentials are generated (also referred to as "computed") from TPP public key(s) 111 and PD key pairs stored in DO-PD memory 121. As described subsequently in detail, exclusive self-escrow credentials generated in block 123 may include, but are not limited to, one or more passcodes, keys (including but not limited to public and symmetric key pairs and computed shared secret keys) and assigned random numbers, including hashed-keys, hashed-random numbers, device ID's, and time stamps, which are computed values checked at critical junctures in the unlocking process. In certain embodiments, the exclusive self-escrow credentials include both a resident credential and challenge credential, as discussed subsequently. In certain other embodiments, the generation of credentials may occur during unlocking of DO-PD 120 and before they are required for authentication.

FIG. 1 shows the exclusive self-escrow credentials generated during the setting up of the locking of DO-PD 120. In general, however, it is only important the credentials be generated before they are used for unlocking, and thus in various embodiments, some or all credentials may be generated before the set up of block 122, some or all of the credentials may be generated as shown in FIG. 1, and some or all of the credentials may be generated after DO-PD 120 is placed in escrow mode of block 125.

Lastly, as provided by steps in block 124, DO-PD 120 is then locked.

To unlock a locked DO-PD 120, TPP 10 obtains permission to access DO-PD 120, as by a court order, which provides the TPP with the authority to unlock the DO-PD. After obtaining and validating such access, TPP 10 sends an electronic request to block 113 to unlock the DO-PD, which is sent to block 125 in DO-PD 120, which places the DO-PD in escrow mode ("Emode").

The electronic request of block 113 to place DO-PD 120 in Emode may occur by any of a number of methods. Thus, for example, the electronic request of block 113 may be a predetermined alphanumeric code or a format of a alphanumeric code that is entered in place of the standard passcode, or may be for the example of a smartphone, the pressing of a specific combination of buttons on the phone, similar to the rebooting of the phone.

Escrow mode is a limited interactive state that is available when DO-PD 120 is locked, whereby only a designated third-party, the TPP, can unlock the DO-PD. Prior to unlocking DO-PD 120, TPP 10 must attest that certain conditions have been met before taking any action to unlock the DO-PD. When DO-PD 120 is placed in escrow mode in block 125, a portion of DO-PD 120 is set aside as TPP-PD 112. TPP-PD 112 provides for "workspace limited" action, via P of DO-PD 120, whose actions are limited to receiving certain data from DO-PD 120 or TPP-'PD 110 computing certain additional data using available data, and sending certain data to the DO-PD or the TPP-'PD.

In certain embodiments, block 125 executes steps to ensure that TPP 10 is a TPP authorized to unlock DO-PD 120, such as by determining if request 113 is a predetermined credential in format or stored in DO-PD 120.

As discussed subsequently, a locked DO-PD 120 is unlocked by mutual identification of domain TPP-'PD 110 and of domain DO-PD 120 through exclusive self-escrow credentials. Since during the process of unlocking TPP-'PD 110 is under control of TPP 10 and DO-PD 120 was previously under the control of DO 20, the use of exclusive self-escrow credentials to unlock DO-PD 120 presumably also authenticates both the TPP and the DO.

Once DO-PD 120 is placed into Emode, the authentication steps of block 126 are executed, specifically the steps of both blocks 131 and 133. As described subsequently, unlocking DO-PD 120 requires the authentication of the DO-PD via TPP-'PD 110, which occurs in block 131, and the authentication of the TPP-'PD 110 by the DO-PD, which occurs in block 133. The order of the execution of blocks 131 and 133 depends on the embodiment, as long as both blocks are executed.

The steps of blocks 131 and 133 have access to the contents of TPP-PD memory 135, which also includes the transfer of information between DO-PD memory 121 and TPP-PD memory 135. The transferred information may include, but is not limited to, certain credentials and certain PD public keys. In general, communications between TPP-PD 112 and DO-PD 120 are secure from unwanted requests from the DO-PD. This permits TPP 110 to securely use TPP private key(s) 115 within either TPP-'PD 110 or TPP-PD 112, without concern of loosing required control of a private key.

In block 131, TPP-'PD 110 authenticates DO-PD 120 within one or more of TPP-'PD 110 and/or TPP-PD 112 using credentials that are generated and/or stored in the DO-PD. In certain embodiments, the authenticating of block 131 is accomplished by a two-way authentication process, in which there is an exchange and comparison of messages between DO-PD 120 and TTP-'PD 110 and/or TPP-PD 112 that require, for example and without limitation, the use of private or shared PD or TPP keys. As discussed subsequently, a message is a file that acts as a secure container of credential information utilized in unlocking a program domain.

In block 133, DO-PD 120 authenticates TTP-'PD 110 within the DO-PD using credentials that are generated and/or stored in the DO-PD. In certain embodiments, the authenticating of block 133 is accomplished by a two-way authentication process, in which the exchange and comparison of messages between DO-PD 120 and TTP-'PD 110 and/or TPP-PD 112 that require, for example and without limitation, the use of private or shared DP or TPP keys.

The authenticating of blocks 131 and 133 as discussed herein may include, but is not limited to, one or more of the following steps: comparing two credentials, where the credentials may be a resident credential (a standard credential trusted by the authenticator) and a challenge credential (a work-being-measured credential provided to the authenticator by the party being authenticated); exchanging messages between DO-PD 120 and TTP'PD 110 or TTP-PD 112, or other third party domains or subdomains, where the messages are credentials, contain information used to generate (that is, compute) a credential including but not limited to, a random number, a hashed passcode or other identifying number, or encryption key, revealing a credential by decryption, or retrieving a credential or information used to generate or reveal a credential from a secure object, such as a file, or retrieving a credential or information from a secure location. In general, one or more of the steps besides the comparing of credentials may be performed before the comparing steps, such as discusses with reference to FIG. 1, or after locking DO-PD 120.

At block 127 if either the authentication in block 131 or 133 fails, then the unlocking process terminates. If both of the authentications in block 131 and 133 are achieved, then DO-PD 120 is unlocked in block 128.

In an alternative embodiment, the cooperation of more than one third party is required to unlock DO-PD 120. Thus, as an example, TPP 10 may be the manufacturer of the PD (such as the manufacturer of a smartphone), while additional third parties may have some other affiliation with the PD, such as a different smartphone manufacturer or may be some other entity, such as a privacy advocacy organization. TPP 10 takes the lead in unlocking DO-PD 120 as illustrated in schematic 100. After the TPP is authenticated by the DO-PD 120, as in block 131, the DO-PD performs an authentication for each of the other third parties in a manner similar to that of block 131. Thus, for example, for each of the other third parties, there may be an exchange of messages between the DO-PD 120 that enable the DO-PD to authenticate each of the other third parties. The authentication of TPP 10 and each of the other third parties is required to complete authentication, as in block 127.

While schematic 100 is described for use with a smartphone, the method may be executed on other hardware devices, such as tablets or computers, with or without a dedicated hardware secure area (HSA), or cloud-based secure storage. The method may also be implemented on locked sub-program domains, which are independent program domains within another program domain, such that the sub-program domain may remain locked even though it resides within an unlocked program domain, such as those governed by a vertical software application, operating in a software storage area.

An example of a locked sub-program domain is a bit-coin wallet or other password protected software program with data. There are no special hardware requirements beyond those which are currently in place today, and the system works with or independent of dedicated hardware areas, such as the Secure Enclave Processor, in the iPhone, and similar areas on other devices. In the event that court-ordered exceptional access is attempted, the device cannot be returned to its normal operational state, to insure awareness of intrusion, or an attempted intrusion. The exclusive self-escrow credentials are always securely held within the program domain, and under the full control of a protected program, thus providing the highest level of security and privacy available, while at the same time making the device court-order accessible. End-to-end encryption remains fully in place, with no cryptographic backdoors, but with an available avenue of court-ordered exceptional access.

FIGS. 2 and 3 are schematic diagrams which illustrate one embodiment of a system 200 for executing the steps of schematic 100.

FIG. 2 shows details of system 200, including a TPP device 210, a DO device 230 which includes a lockable DO-PD 120, and a communications capability 220 connecting P, the program of the TPP device to P, the program of the DO device. TPP device 210 includes a communications capability 211, a memory 213, and a processor 215. In certain embodiments, TPP device 210 maintains, in memory 213, encryption keys, including TPP private keys, and optionally a database of lockable DO-PDs and DO-PD public encryption keys.

As an illustration of a horizontal program domain, DO device 230 is, for example and without limitation, a smartphone that includes a touchscreen 231, a communications connector 232, a memory 233, and a processor 234. Memory 233 contains operating instructions of system 200, which processor 234 interprets to operate touchscreen 231 as an input and output device. Communications connectors 211 and 232 are serial communications connectors that can be connected using an appropriate communications capability 220. Examples of communications connectors 211 or 232 include, but are not limited to, USB Type-C ports, micro-USB ports, QR codes, NFC formats, or FireWire® ports (Apple Computer, Inc., Cupertino, Calif.) Memory 233 includes programming required to operate DO device 230 (such as an operating system or virtual machine instructions). Memory 233 may also include a hardware secure area (HSA), including its own dedicated controlling hardware secure area program (HSAP), and referred to as a Secure Enclave Processor (SEP) in the case of the iPhone, or in the case of Android devices, asTitan M, or ARM TrustZone.

As an illustration of a vertical program domain, DO device 230 is a electronic device, such as a computer or a smartphone, having an lockable DO-PD 120 which may be, for example and without limitation, a database, word processor, spreadsheet, or bitcoin wallet.

The following discussion presents embodiments of system 200 as operating on TPP device 210 and DO device 230. Specifically, memory 215 includes stored programming instructions that processor 234 interprets to perform method steps described herein on TPP device 210 and to communicate with DO device 220 over communications cable 210, and memory 233 includes stored programming instructions that processor 234 interprets to perform method steps described herein on the DO device and to communicate with the TPP device over the communications cable. Memory 215 and 233 may also include stored encryption keys and other information for locking and unlocking DO-PD 120, as described herein.

In one embodiment, memory 213 includes programming for processor 215 to execute the functions illustrated in FIG. 1 as being in TTP-'PD 110 and TPP-PD 112, and memory 233 includes programming for processor 234 to execute the functions illustrated in FIG. 1 as being in DO-PD 120.

Encryption

The security of exclusive self-escrow is accomplished, in various embodiments, using one or more of two different approaches to encryption, whose computational hardness is proven and accepted. The first approach is public key encryption. The second approach is symmetric key encryption, using a key exchange protocol which may be, for example and without limitation, the Diffie-Hellman key exchange protocol (DHKX). In addition, one-way mathematical functions, including hashing of keys and random numbers, as well as unique device identifiers and time stamps may be used. public keys are not published to any PM (public key infrastructure) entities, rather they are made available to participants by including them within messages or from accessible domain locations.

Symmetric Encryption: Exclusive self-escrow may utilize computed shared secret keys as the escrow passcode, using DHKX and, in turn, that value is utilized as a credential, or to encrypt one-way function access data, which is later revealed, at the time of exceptional access. In certain embodiments, TPP 10 or DO-PD 20 generate shared secret keys from symmetric key pairs (2), where a public key of one key pair is matched to a private key of the other key pair. While unpublished, through a PM, the public keys are still treated as such, cryptographically.

Public Key Encryption: Exclusive self-escrow may encrypt one-way function access data using the asymmetric public key of the TPP-'PD 110 or DO-PD 120, so that the TPP or PD can later reveal that access data for authentication, at the time of exceptional access.

Authentication

Exclusive self-escrow may, in certain embodiments, utilize one or more of various credentials for authentication between DO-PD 120 and TPP-'PD 110 including, but not limited to, passcodes, shared secret keys, random numbers, unique device IDs, time stamps, and hashed versions of each, as well.

Shared Secret Key Authentication: Exclusive self-escrow authentication may, in certain embodiments, utilize shared secret keys computed from respective public and private keys of DO-PD 120 and TPP-'PD 110 or hashed shared secret keys (referred to herein as a "HSSK") for subsequent authentication, at the initiation of exceptional access.

Random Number Authentication: Exclusive self-escrow authentication may, in certain embodiments, utilize random numbers, hashed random numbers, and random number functions, which are computed, for example and without limitation, within DO-PD 120 or TPP-'PD 110, as credentials for use in authentication, at the either unlocking set up or initiation of exceptional access, or both. In various embodiments, random numbers or hashed random number values are encrypted and stored as credentials, prior to exceptional access, for subsequent use in authentication. The generation of random numbers, random number functions, and hashing are known in the art.

In certain embodiments, the random numbers used for authentication, which are referred to herein as "special random numbers" are selected from a predetermined pool of random number or are stored with a specific format. Authentication occurs if the a provided special random number is within the predetermined pool of random numbers or has a predetermined format.

Unique Device ID (Identifier) and Time Stamp Exclusive self-escrow authentication may, in certain embodiments, utilize a unique device ID one-way function credential and/or a time stamp one-way function credential.

Messages

Exclusive self-escrow may, in certain embodiments, utilize messages for authentication. Messages are secure objects of information that may be encrypted, for example, and that are exchanged between DO-PD 120 and TPP-PD 112 or TPP-'PD 110, and which may contain items that are used to generate a credential, such as an encryption key, or an encrypted credential, or may be, in and of themselves, a credential.

In general, as described in further detail herein, messages may contain, but are not limited to containing, a credential, a passcode, a random number, a device IDs, a Device Time, an encryption key, or a hashed versions of any of these. Messages may also be encrypted.

Messages may, in certain embodiments, contain more than one item, such as an encryption key and a credential, such as a passcode, or more than one encryption key. Messages with more than one item are useful in efficiently providing multiple items required, for some embodiments, for authenticating the various parties Implementation Details and Assumptions Certain embodiments of the inventive exclusive self-escrow method and apparatus include a program (P) that is running in one or more of DO-PD 120, TPP-'PD 110, or TPP-PD 112, at least one encryption container "message" object, and three participants, including the DO, such as DO 20, TPP 10, and an investigative government authority (GA). TPP 10 is a third-party who is, optionally, also the provider of the program domain (i.e. device manufacturers). It is understood that TPP 10 could be a third party that fulfills the role of TPP, while not having actually providing the DO-PD 120 to DO 20. TPP 10 always has a public key pair, consisting of their private key and a public key that are stored in TPP-'PD 110. DO-PD 120 may, in several embodiments, have at least one public key pair. While the public key(s) of the key pairs are not a secret, they are not published, but rather made available administratively and without security. The private keys are secret, and are held and administered securely. One-way function access data are any data used in the computation of a passcode; key; random number value; random number function; unique device identification; time stamp; hashed version; or the like.

In certain embodiments, unlocking DO-PD 120 using P occurs after the each party have authenticated the other party by comparing a resident credential and a challenge credential. At the time of exceptional access, these credentials, such as the escrow passcodes, are compared to each other for a valid match, verifying the authenticity of the TPP and the DO-PD. Thus, for example, DO-PD 120 authenticates TPP-'PD 110 when a resident credential, that is stored, revealed, or computed in the DO-PD, is equal to a challenge credential that is provided to the DO-PD from TPP-'PD 110 or TPP-PD 112. Further, for example, TPP-'PD 110 authenticates DO-PD 120 when a resident credential, that is stored, revealed, or computed in the TPP-'PD or TPP-PD 112, is equal to a challenge credential that is provided to the TPP-'PD or TPP-PD from the DO-PD. In certain other embodiments, the challenge credential is generated during the unlocking process. In certain embodiments, the program P runs on TPP-'PD 110 prior to the TPP authenticating DO-PD 120, and then on TPP-PD 112 after the TPP authenticates DO-PD.

Each escrow passcode copy exists in either a revealed or an unrevealed state. As revealed, each passcode copy is an alpha-numeric sequence. As unrevealed, each passcode copy is an alpha-numeric sequence, different than (not equal to) the alpha-numeric sequence of its revealed state. When a passcode copy is encrypted it is transformed, by P, from a revealed state to an unrevealed state. When a passcode copy is stored, whether in the PD or the hardware secure area (HSA), its state is unchanged by P of PD. The resident escrow passcode, revealed by P of DO-PD, and the challenge escrow passcode, revealed or computed via P of TPP-PD, through the actions of the authentic TPP. HSAP always returns stored information to P of PD in the state it was received from P. The resident escrow passcode, whether unrevealed, revealed, or in a state of computation, is exclusive to the DO-PD. The challenge escrow passcode, whether unrevealed, revealed, or in a state of computation, resides exclusively in TPP-PD, as well.

In certain embodiments escrow passcodes, when extended as hash values, may be delivered and compared both inside and outside of encrypted messages, because possession is constrained by access to the non-hashed escrow passcode. Thus, for example, the source of the hashed escrow passcode may be stored securely to insure that the challenge escrow passcode in its hashed form could only have been revealed by the authentic TPP.

In certain embodiments, hashed-key credentials may be created and securely stored when the normal passcode is instituted and the escrow passcode credential is created, and are then utilized in authenticating the device program domain and third-party against imposters, during exceptional access. In certain embodiments, hashed-key challenge credentials are created at the time of exceptional access.

In certain embodiments, credentials, such as escrow passcodes, are generated as products of symmetric encryption, and those same keys-as-passcodes may also be used to encrypt access data. Escrow passcodes may be generated directly from P, or hash values of access data, generated from key pair combinations. Hashed values, including those from random numbers, are used to authenticate the third-party and the DO-PD.

Certain embodiments may include multiple third-parties which may use a number of different key pairs in the process of authentication. Thus, a message may support multiple unique secure containments of credentials using different public keys, wherein DO-PD 120, via P, encrypts escrow challenge credential n number of times into a single message using n number of unique public keys, such that n number of third-parties are required to reveal their individual valid challenge credentials for comparison, via P, to the resident credential. Additional third-party participation lessens the risk that TPP 10 might inadvertently or purposefully choose to unlock a device without fulfillment of conditions. Leading third-party candidates are from the group of TPP's, as they are fully-invested stakeholders. The complete resident credentials can be matched, whereby P unlocks DO-PD 120. It is possible to place each copy of a challenge credential in its own message, as well. The embodiments utilizing escrow passcodes are best suited for multiple third-parties, where authentication needs to occur at the beginning of the unlocking process, to affirm DO-PD 120 and TPP 10, and, due to multiple third parties and time-delays, again at the completion of the authentication process, wherein DO-PD is subsequently unlocked by the TPP.

Various embodiments express no built-in time delay function for failed unlocking attempts, or time constraint function on TPP 10, and other potential third parties, for time allotted by P to unlock DO-PD 120 once a PD is placed into escrow mode, as per block 125. The time-delay and time-constraint functions are feasible additions to the embodiments. It is reasonable that a limited amount of time might be allowed to pass between placing a program domain into Emode and when a valid challenge credential is received. Such a time limit would severely restrict 'man-in-the-middle' cryptographic attacks. It is also reasonable that a failed attempted to reveal the valid challenge credential might trigger a delay period that must pass before another attempt is allowed. This delay period would further limit brute-force attempts to unlock a program domain. It is also reasonable, especially in the case of multiple third-party implementations, that a time limit might enforce the amount of time allowed to submit authentication of all designated third-parties required to unlock a program domain. This constraint further lowers the risk of a single third-party provider conversion of their agreed role.

Exclusive self-escrow methods presented herein assume two secure states of the PD, independent of the system. The first and highest state is that of the hardware secure area (HSA), such as the Secure Enclave Processor (SEP) of the iPhone, and similar hardware devices, in combination with system-encrypted locking, via a normal passcode. The second secure state operates without the benefit of an HSA, or the like, whereby security is administered by system-encrypted locking, via a normal passcode installation. The third state is unlocked, with no installed normal passcode, and no active security system. While the OS-encrypted first and second states are objectively secure from an outsider's vantage point, any credential system dependent on these defenses is vulnerable to any known or unknown weaknesses of those systems. By offering approaches both inclusive and exclusive of the HSA, and/or the system encryption, this presentation focuses deliveries integrated with the highest level of security currently in place, but also fully independent of the OS, as well.

Certain other embodiments include additional third parties that are authenticated by DO-PD 120 during the unlocking of the DO-PD. Thus, for example and without limitation, DO-PD 120 may authenticate each of the additional third parties through the methods described above.

Multiple Third-Parties

The invention is generally described as including a single third-party as the TPP. In general, however, more than one third party may be involved in the unlocking of a program domain. The messages described herein support multiple unique secure containments of credentials using different public keys, wherein DO, via P, encrypts escrow challenge credential a number, N, times into a single message using N unique public keys, such that N third-parties are required to reveal their individual valid challenge credentials for comparison, via P, to the resident credential. Additional third-party participation lessens the risk that a TPP might inadvertently or purposefully choose to unlock a device without fulfillment of conditions. Leading third-party (TP) candidates are from the group of TPP's, as they are fully-invested stakeholders. The complete resident credentials can be matched, whereby P unlocks PD. It is possible to place each copy of a challenge credential in its own message, as well. In certain embodiments, escrow passcodes are well-suited for multiple third-parties, where authentication needs to occur at the beginning of the unlocking process, to affirm the PD and TPP, and, due to multiple third parties (TP's) and time-delays, again at the completion of the authentication process, wherein the PD is subsequently unlocked by the TPP.

In general, any of the embodiments described herein may be adapted to support any number of third parties, as illustrated, for example and without limitation, in the second embodiment.

Embodiments

Each embodiment of the exclusive self-escrow methods presented herein utilizes some combination of different messages (access data) and content, encryption methods (asymmetric and symmetric), and one-way function credential types, to accomplish authentication of the program domain and the third-party(s). Whereas public key encryption provides a means for protecting authenticating one-way function credentials, symmetric encryption provides for both producing and protecting one-way function credentials for bi-directional authentication. Each type of credential exhibits a unique functional character that supports its role in authentication, with a focus on one-way functionality and state expression. The HSA (hardware secure area), on certain devices, can substitute for an encrypted message.

Several embodiments of the method illustrated in schematic 100 are now presented in greater detail. The following discussion make reference to actions between DO-PD 120, TPP-'PD 110, and TPP-PD 112. It will be understood that the programming of DO-PD 120, such as program P, is stored in memory 233 and is executed in processor 234, that DO-PD memory 121 and TPP-PD memory 135 are both within memory 233, and that the DO-PD and TPP-'PD 110 communicate via communications cable 220.

It is to be understood in the following discussion that statements regarding the actions taking place within DO-PD 120, TPP-'PD 110, and TPP-PD 112 have the following meaning: DO-PD 120 "creates," "forms," "encrypts," or "decrypts" a message (for example) means that the message is computed using processor 234 and is stored in memory 233; DO-PD 120 "hashes" a value (for example) means that the value is submitted to a hashing algorithm yielding a hash value using processor 234 and is stored in non-volatile memory 233; DO-PD 120 "uses" a message (for example) means that the message, as a whole, or contents, in part, are retrieved from memory 233 for a calculation in processor 234; DO-PD 120 "copies" or "renames" a message or variable (for example) means that a copy of the message or variable is duplicated as another message or variable, as it is stored in memory 233; DO-PD 120 "stores" a message (for example) means that a copy of the message or variable is stored in DO-PD memory 121; DO-PD 120 "destroys" or "deletes" a message (for example) means the message is erased from memory 233; DO-PD 120 "provides," "releases," or "reveals" a message (for example) to TPP-PD 112" means that the message is copied from memory 233 to TPP-PD memory 135; TTP-'PD 110 "creates," "forms," "reveals," "encrypts," or "decrypts" a message (for example) means that the message is computed using processor 215 and is stored in memory 213; TTP-'PD 110 "hashes" a number (for example) means that the number is hashed using processor 215 and is stored in memory 213; TTP-'PD 110 "uses" a message (for example) means that the message is retrieved from memory 213 for a calculation in processor 215; TTP-'PD 110 "copies" or "renames" a message (for example) means that a copy of the message is stored in memory 213; TTP-'PD 110 "provides," "releases," or "reveals" a message (for example) to DO-PD 120 or TPP-PD 112 means that the message is copied from memory 213 to DO-PD memory 121 or TPP-PD memory 135, respectively; TPP-PD 112 "creates," "forms," "reveals," "encrypts," or "decrypts" a message (for example) means that the message is computed using processor 215 of DO-PD 120, using P, and is stored in TPP-PD memory 135; TPP-PD 112 "hashes" a number (for example) means that the number is hashed using processor 215 of DO-PD 120, using P, and is stored in TPP-PD memory 135; TPP-PD 112 "uses" a message (for example) means that the message is retrieved from TPP-PD memory 135 for a calculation in processor 215 using processor 215 of DO-PD 120, using P; TPP-PD 112 "copies" a message (for example) means that a copy of the message is stored in TPP-PD memory 135; TPP-PD 112 "provides," "releases," or "reveals" a message (for example) to DO-PD 120 or TTP-'PD 110 means that the message is copied from TPP-PD memory 135 to DO-PD memory 121 or memory 213, respectively; and TPP-PD 112 "stores" a message (for example) means that a copy of the message is stored in TPP-PD memory 135.

Several embodiments are now presented which illustrate various features of an exclusive self-escrow method and system, as described above, and FIG. 18 includes a table 1800 showing embodiment feature in the top row, each embodiment in the right column, and the use of each feature for each embodiment in the body of the table. The features include the use of secure HSA storage, the number of messages exchanged between DO-PD 120 and the TTP'PD 110 or TPP-PD 112, the method of, such as public key encryption, symmetric key encryption, and the total number of encryption used, and the use of "A" credential types, which include passcodes and hashed passcodes, and the use of "B" credential types, which includes shared-secret keys or hashed shared-secret keys, random numbers, hashed random numbers, or random number functions, device identification numbers, and time stamps.

In general, each of the embodiments utilize at least one message, one encryption method, and two types of credentials. and they all utilize at least one "B" credential type. All of the embodiments, except for embodiment 9, utilize at least one public encryption key pair. Embodiments 1 and 3 both use the HSA (hardware secure area), along with escrow passcode and random numbers as authenticating credentials. Embodiments 1 and 10 through 14 use only public key encryption methodology. Embodiments 2 through 8 utilize both public key and symmetric encryption methodology. Embodiments, 6, 7, 8, and 14 do no use an "A" credential type.

First Embodiment

Figure 4:
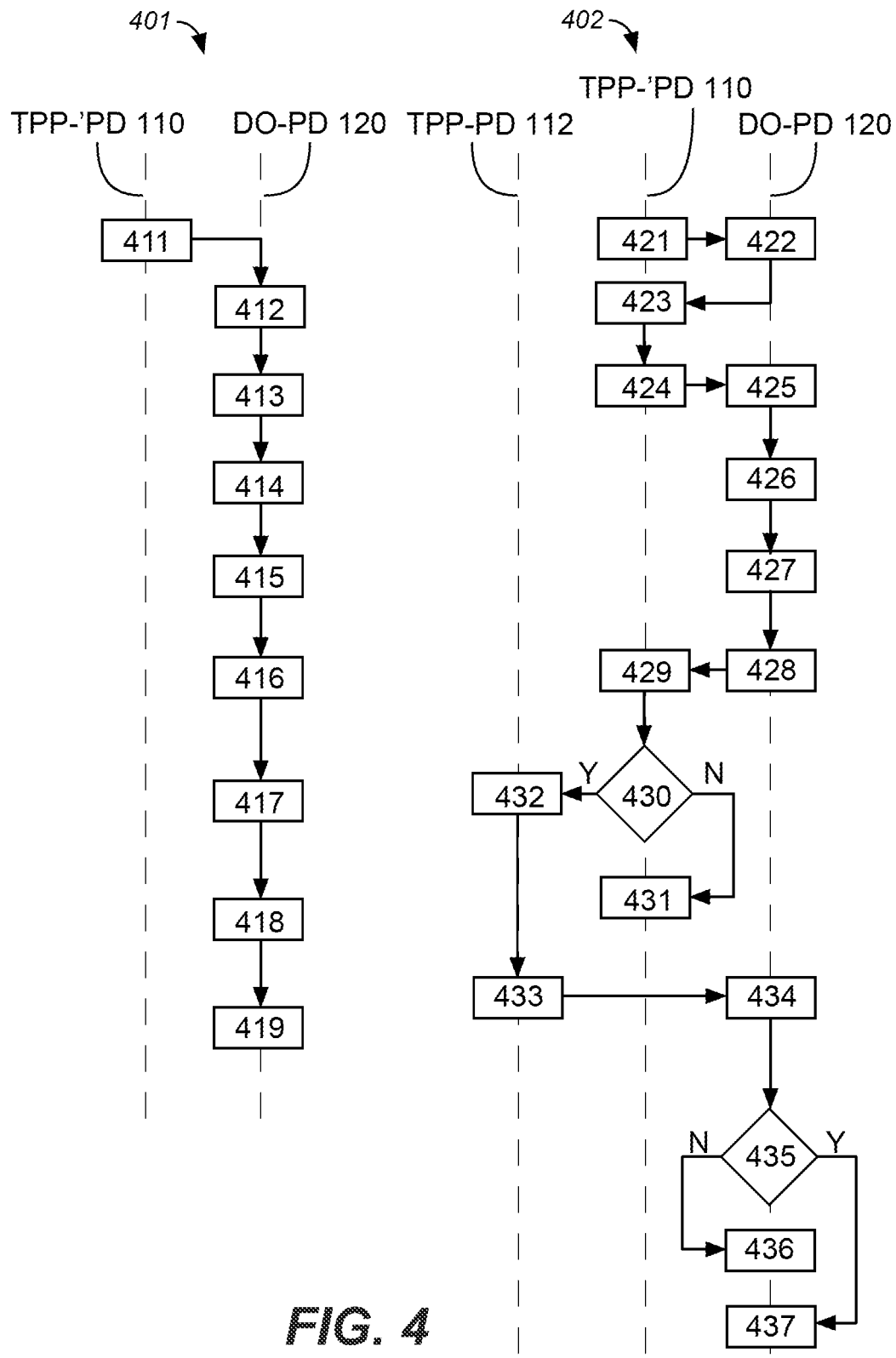
FIG. 4 is a flowchart of a first embodiment exclusive self-escrow method.

A first embodiment exclusive self-escrow method is shown in FIG. 4 as a flowchart 401 and a flowchart 402, where flowchart 401 includes steps for locking DO-PD 120 in blocks 411-419, and where flowchart 402 includes steps for then unlocking the DO-PD locked according to the steps of flowchart 401 in blocks 421-437. To aid in illustrating which domains which each of the blocks in FIG. 4 are executed in, the blocks are aligned along vertical dashed lines domains labeled TPP-'PD 110, TPP-PD 112 and DO-PD 120.

DO-PD 120 may be locked according to the steps of flowchart 401. as per blocks 122, 123, and 124, as follows:

In block 411, TPP 10 creates a TPP key pair as a TPP private key and a TPP public key. The TPP private key is stored in TPP-'PD 110 and the TPP public key is provided to and stored in DO-PD memory 121.

In block 412, after DO 20 engages with DO-PD 120, DO-PD 120, using P, creates a PD key pair as a PD private key and a PD public key, which are stored in DO-PD memory 121.

In block 413, DO-PD 120, using P, creates and stores an escrow passcode.

In block 414, DO-PD 120, using P, stores copies of the escrow passcode as an escrow passcode #1 and an escrow passcode #2.

In block 415, DO-PD 120, using P, encrypts escrow passcode #2 into a message #1 using the TPP public key, as described above in the section titled ENCRYPTION.

In block 416, DO-PD 120, using P, encrypts the PD public key and message #1 into a message #2 using the TPP public key, as described above in the section titled ENCRYPTION.

In block 417, DO-PD 120, using P, stores the message #2 and the TPP public key in the DO-PD memory 121.

In block 418, DO-PD 120, using P, transfers escrow passcode #1 and the PD private key to the hardware secure area (HSA), which is described above.

In block 419, DO-PD 120, using P, deletes the escrow passcode and the PD public key.

After the execution of block 419, DO-PD 120 is locked according to the first embodiment exclusive self-escrow method.

The DO-PD 120 locked according to the steps of flowchart 401 may be unlocked according to the steps of flowchart 402, as per blocks 125, 126, 127, and 128, as follows:

In block 421, TPP-'PD 110 receives a validated unlock request, as per block 113.

In block 422, TPP-'PD 110, using P, places DO-PD 120 into escrow mode, as per block 125, and releases the message #2 from DO-PD 120 to TPP-PD 112.

In block 423, TPP-'PD 110, using P, decrypts the message #2 using the TPP private key, thereby revealing the PD public key and message #1.

In block 424, TPP-'PD 110, using P, creates a Temp TPP key pair as a Temp TPP private key and a Temp TPP public key, and creates a random number, RND #1.

In block 425, TPP-'PD 110, using P, encrypts the Temp TPP public key and the RND #1 into a message #3 using the PD public key, and releases message #3 to DO-PD 120.

In block 426, DO-PD 120 decrypts message #3 using the PD private key, thereby revealing the Temp TPP public key and RND #1.

In block 427, the DO-PD 120, using P, copies the RND #1 from block 426 to a RND #2.

In block 428, the DO-PD 120, using P, encrypts RND #2 into a message #4 using the Temp TPP public key, and gives message #4 to TPP-'PD 110.

In block 429, TPP-'PD 110, using P, decrypts message #4 using the Temp TPP private key, thereby revealing RND #2.

Block 430 then performs a test whereby TPP-'PD 110 authenticates DO-PD 120. Specifically, TPP-'PD 110, using P, compares resident credential RND #1 from block 424 and challenge credential RND #2 from block 429. If the correct keys have been used in the determining of the credentials, then at block 430, RND #1 and RND #2 are identical. Thus, in block 430, TPP-'PD 110, using P, compares RND #1 and RND #2. If RND #1 equals RND #2 then DO-PD 120 is authenticated to TPP-'PD 110, and the result of block 430 is "Y," and if RND #1 does not equal RND #2 then the authentication has failed and the result of block 430 is "N."

If the result of block 430 is "N," then the authentication has failed and execution of the unlocking of DO-PD 120 stops at block 431.

If the result of block 430 is "Y," then then DO-PD 120 is authenticated to TPP-'PD 110 and the unlocking proceeds to block 432, where TPP-PD 112, using P, decrypts message #1 using the TPP private key, thereby revealing escrow passcode #2.

In block 433, TPP-PD 112, using P, encrypts escrow passcode #2 into a message #5 using the PD public key, and gives message #5 to DO-PD 120.

In block 434, DO-PD 120, using P, decrypts message #5 using the PD private key to reveal escrow passcode #2.

Block 435 then performs a test whereby DO-PD 120 authenticates TPP-'PD 110. Specifically, DO-PD 120, using P, compares the resident credential escrow passcode #1 from block 418 and challenge credential escrow passcode #2 from block 434. If the correct keys have been used in the determining of the credentials, then at block 435, escrow passcode #1 and escrow passcode #2 are identical. Thus, in block 435, DO-PD 120, using P, compares escrow passcode #1 to escrow passcode #2. If escrow passcode #1 equals escrow passcode #2 then TPP-'PD 110 is the authenticated to DO-PD 120 and the result of block 435 is "Y," and if escrow passcode #1 does not equal escrow passcode #2 then the result of block 435 is "N."

If the result of block 435 is "N," then a step of the authentication has failed and execution of the unlocking of DO-PD 120 stops at block 436.

If the result of block 435 is "Y," then all authentications have passed, and the unlocking proceeds to block 437, where DO-PD 120, using P, unlocks the DO-PD.

With DO-PD 120 unlocked the GA can now access the DO-PD, per the warrant for the device.

Second Embodiment

Figure 5:
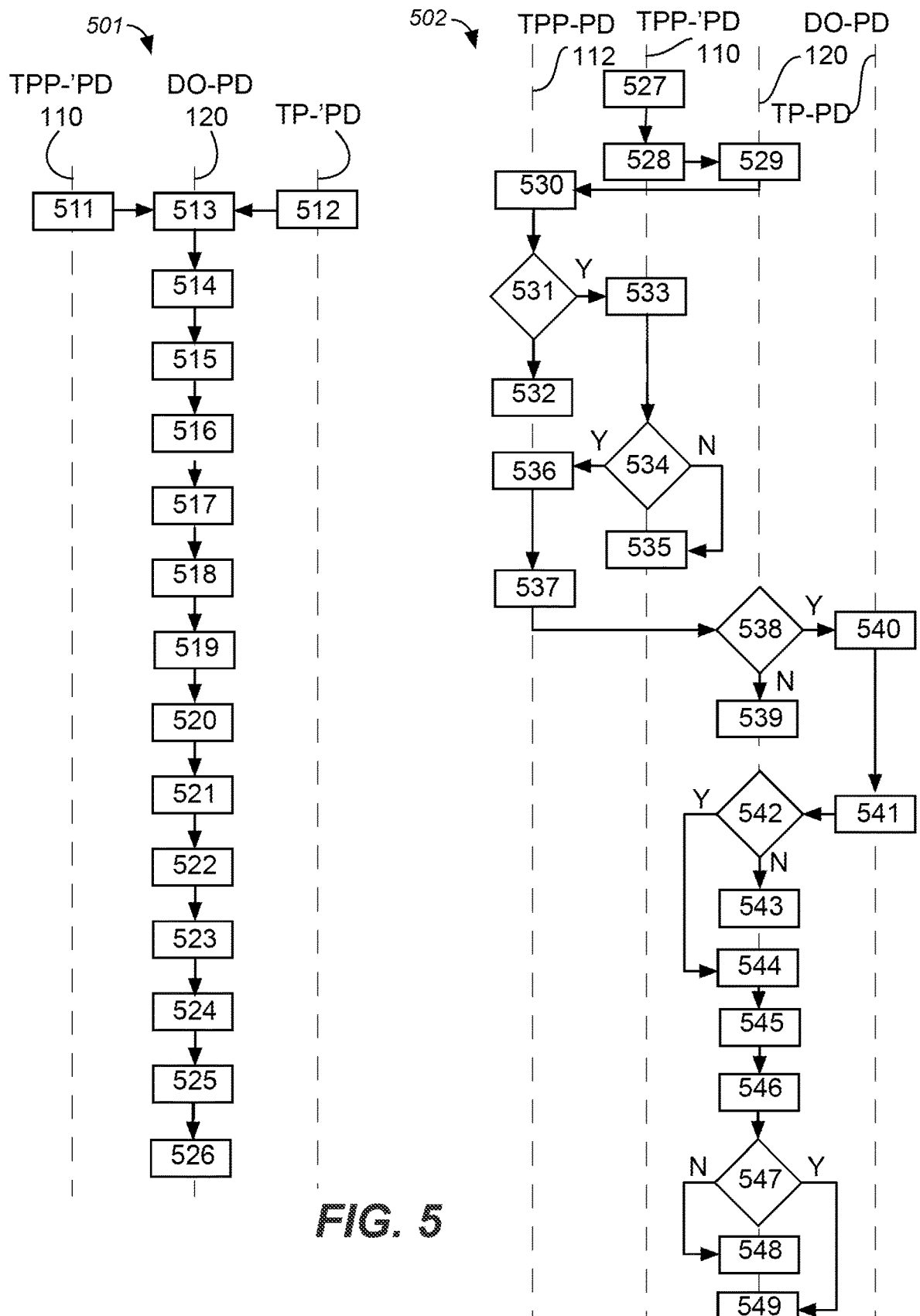
FIG. 5 is a flowchart of a second embodiment exclusive self-escrow method.

A second embodiment exclusive self-escrow method is shown in FIG. 5 as a flowchart 501 and a flowchart 502, where flowchart 401 includes steps for locking DO-PD 120 in blocks 511-526, and where flowchart 402 includes steps for then unlocking the DO-PD locked according to the steps of flowchart 501 in blocks 527-549. The second embodiment exclusive self-escrow method is generally similar to the previous embodiment exclusive self-escrow methods, except as explicitly stated.

This embodiment illustrates a second third party, denoted "TP" which has a device with a TP-'DP partition similar to the TTP-'PD partition.

DO-PD 120 may be locked according to the steps of flowchart 501, as per blocks 122, 123, and 124, as follows:

In block 511, TTP-'PD 110 creates a TPP key pair as a TPP private key and a TPP public key, and creates a symmetric TPP key pair as a symmetric TPP private key and a symmetric TPP public key, and provides the TPP public key and the symmetric TPP public key to DO-PD 120.

In block 512, TP-PD creates a symmetric TP key pair as a symmetric TP private key and a symmetric TP public key, and provides the symmetric TP public key to DO-PD 120.

In block 513, DO-PD 120, using P, creates a symmetric PD key pair #1 as a symmetric PD private key #1 and a symmetric PD public key #1, creates a symmetric PD key pair #2 as a symmetric PD private key #2 and a symmetric PD public key #2, creates a symmetric PD key pair #3 as a symmetric PD private key #3 and a symmetric PD public key #3, and creates a PD key pair as a PD public key and a PD private key.

In block 514, DO-PD 120, using P, creates a escrow passcode from a generated random number.

In block 515, DO-PD 120, using P, copies the escrow passcode to form both a escrow passcode #1 and a escrow passcode #2.

In block 516, DO-PD 120, using P, creates a shared secret key, SSK #1, using the symmetric PD private key #1 and the symmetric TPP public key.

In block 517, DO-PD 120, using P, creates a shared secret key, SSK #2, using the symmetric PD private key #2 and the symmetric TPP public key.

In block 518. DO-PD 120, using P, creates a shared secret key, SSK #3, using the symmetric PD private Key #3 and the symmetric TP public key.

In block 519, DO-PD 120, using P, hashes the SSK #2 into a HSSK #2.

In block 520, DO-PD 120, using P, hashes the SSK #3 into a HSSK #3.

In block 521, DO-PD 120, using P, encrypts the escrow passcode #1 into a message #1 using the PD public key.

In block 522, DO-PD 120, using P, encrypts the escrow passcode #2 and the PD private key into a message #2 using the SSK #1.

In block 523, DO-PD 120, using P, encrypts the device ID #1, the symmetric PD public key #1, and the symmetric PD public key #2 into a message #3 using the TPP public key.

In block 524, DO-PD 120, using P, encrypts the SSK #1 into a message #4 using the SSK #2.

In block 525, DO-PD 120, using P, stores the message #1, the message #2, the message #3, the message #4, the HSSK #2, and the HSSK #3 in DO-PD memory 121.

In block 526, DO-PD 120, using P, destroys the escrow passcode, the symmetric PD private key #1, the symmetric PD private key #2, the symmetric PD private key #3, the symmetric PD public key #2, the symmetric PD public key #3, the SSK #1, the SSK #2, and the SSK #3.

After the execution of block 526, DO-PD 120 is locked according to the second embodiment exclusive self-escrow method.

The DO-PD 120 locked according to the steps of flowchart 501 may be unlocked according to the steps of flowchart 502, as per blocks 125, 126, 127, and 128, as follows:

In block 527, TPP-'PD 110 receives a validated unlock request, as per block 113.

In block 528, TPP-'PD 110, using P, places DO-PD 120 into escrow mode, as per block 125, and releases the message #3 to the DO-PD 120.

In block 529, DO-PD 120, using P encrypts the device ID #2 and a current device time of the DO-PD, Time #1, into message #5, using the TPP public key, and releases the message #5 and the message #3 to TPP-PD 112.

In block 530, TPP-PD 112, using P, decrypts the message #5 using the TPP private key, revealing the device ID #2 and the Time #1.

Block 531 then performs a test to determine that a preset time limit has not passed from the beginning of the unlocking. Specifically, TPP-PD 112, using P, compares resident credential Time #1 and the current device time, challenge credential Actual Time. If a preset amount of time has not been exceeded, then the unlocking will proceed. Thus, in block 531, TPP-PD 112, using P, compares Time #1 to the Actual Time. If |Time #1−Actual Time|≤Preset Time then the result of block 531 is "Y," then the unlocking is timely, and if |Time #1−T1>M then too much time has passed and the result of block 531 is "N."

If the result of block 531 is "N," then the authentication has failed and execution of the unlocking of DO-PD 120 stops at block 532.

If the result of block 531 is "Y," then then DO-PD 120 the unlocking proceeds to block 533, and the TPP-'PD, using P, decrypts the message #3 using the TPP private key, revealing device ID #1, the symmetric PD public key #1, and the symmetric PD public key #2.

Block 534 then performs a test whereby TPP-'PD 110 authenticates DO-PD 120. Specifically, TPP-'PD 110, using P, compares the resident credential device ID #1 from block 533 and challenge credential device ID #2 from block 530. If the correct keys have been used in the determining of the credentials, then at block 534, device ID #1 and device ID #2 are identical. Thus, in block 534, TPP-'PD 110, using P, compares device ID #1 to device ID #2. If device ID #1 equals device ID #2 then DO-PD 120 is authenticated to TPP-'PD 110, and the result of block 534 is "Y," and if device ID #1 does not equal device ID #2 then the authentication has failed and the result of block 534 is "N."

If the result of block 534 is "N," then the authentication has failed and execution of the unlocking of DO-PD 120 stops at block 535

If the result of block 534 is "Y," then then DO-PD 120 is authenticated to TPP-'PD 110 and the unlocking proceeds to block 536, where TPP-PD 112, using P, creates a shared secret key, SSK #4 using the symmetric TPP private key and the asymmetric public key #2.

In block 537, TPP-PD 112 hashes the SSK #4 into a HSSK #4, and gives both to DO-PD.

Block 538 then performs a test whereby DO-PD 120 authenticates TPP-'PD 110 as the authentic, true provider of DO-PD 120. Specifically, DO-PD 120, using P, compares the resident credential HSSK #2 from block 615 and challenge credential HSSK #4 from block 633. If the correct keys have been used in the determining of the credentials, then at block 538, HSSK #2 and HSSK #4 are identical. Thus, in block 538, DO-PD 120, using P, compares HSSK #2 to HSSK #4. If HSSK #2 equals HSSK #4 then TPP-'PD 110 is the authenticated to DO-PD 120 and the result of block 538 is "Y," and if HSSK #2 does not equal HSSK #4 then the result of block 538 is "N."

If the result of block 538 is "N," then a step of the authentication has failed and execution of the unlocking of DO-PD 120 stops at block 539.

If the result of block 538 is "Y," then the TPP has been authenticated, and the unlocking proceeds to block 540 to begin authentication of the TP, and where the TP-PD, using P, creates a shared secret key, SK #5, using the symmetric TP private key and the symmetric PD public key #3.

In block 541, the TP-PD, using P, hashes the SSK #5 into a HSSK #5, which is given to DO-PD 120.

In block 542, the DO-PD 120, using P, compares HSSK #3 and HSSK #5, wherein a match authenticates TP.

Block 542 then performs a test whereby DO-PD 120 authenticates the second third party, TP. Specifically, DO-PD 120, using P, compares the resident credential HSSK #3 from block 525 and challenge credential HSSK #5 from block 541. If the correct keys have been used in the determining of the credentials, then at block 542, HSSK #3 and HSSK #5 are identical. Thus, in block 538, DO-PD 120, using P, compares HSSK #3 to HSSK #5. If HSSK #3 equals HSSK #5 then TPP-'PD 110 is the authenticated to DO-PD 120 and the result of block 542 is "Y," and if HSSK #3 does not equal HSSK #5 then the result of block 542 is "N."

If the result of block 542 is "N," then a step of the authentication has failed and execution of the unlocking of DO-PD 120 stops at block 543.

If the result of block 542 is "Y," then the DO and third party authentications have passed, and the unlocking proceeds to block 544, where the DO-PD 120, using P, decrypts the message #4 using the SSK #4, revealing the SSK #1.

In block 545, the DO-PD 120, using P, decrypts the message #2 using the SSK #1, revealing the escrow passcode #2 and the PD private key.

In block 546, the DO-PD 120, using P, decrypts the message #1 using the PD private key, revealing the escrow passcode #1.

Block 547 then performs a second test whereby DO-PD 120 authenticates TPP-'PD 110. The second authentication of the TPP is performed to account for the additional time and activity of additional third party authentication. Specifically, DO-PD 120, using P, compares the resident credential escrow passcode #1 from block 546 and challenge credential escrow passcode #2 from block 545. If the correct keys have been used in the determining of the credentials, then at block 547, escrow passcode #1 and escrow passcode #2 are identical. Thus, in block 742, DO-PD 120, using P, compares escrow passcode #1 to escrow passcode #2. If escrow passcode #1 equals escrow passcode #2 then TPP-'PD 110 is the authenticated to DO-PD 120 and the result of block 547 is "Y," and if escrow passcode #1 does not equal escrow passcode #2 then the result of block 547 is "N."

If the result of block 547 is "N," then a step of the authentication has failed and execution of the unlocking of DO-PD 120 stops at block 548.

If the result of block 547 is "Y," then the authentication steps have all been successful, and the unlocking proceeds to block 744, where DO-PD 120, using P, unlocks the DO-PD.

With DO-PD 120 unlocked the GA can now access the DO-PD, per the warrant for the device.

Third Embodiment

Figure 6:
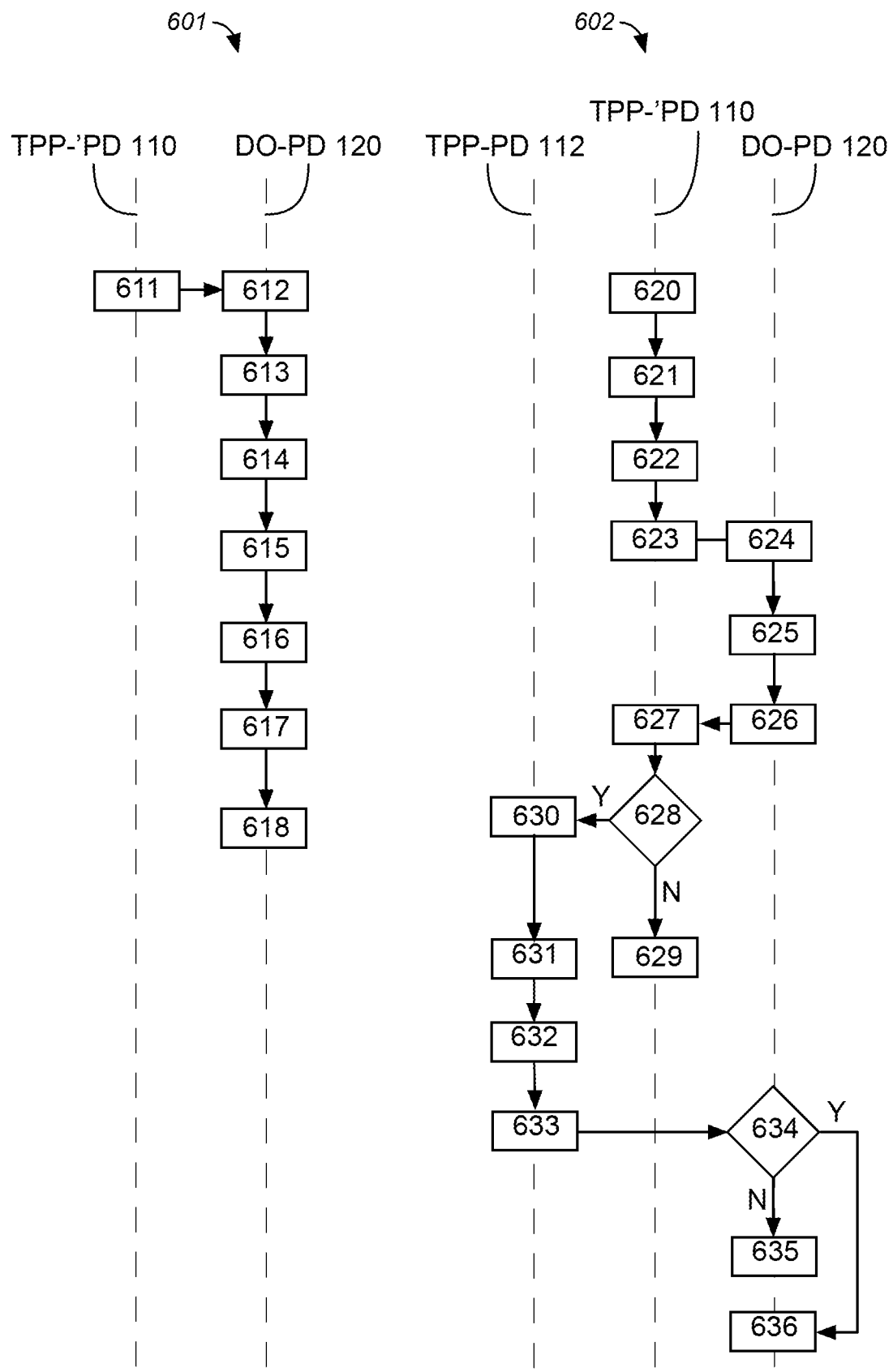
FIG. 6 is a flowchart of a third embodiment exclusive self-escrow method.

A third embodiment exclusive self-escrow method is shown in FIG. 6 as a flowchart 601 and a flowchart 602, where flowchart 601 includes steps for locking DO-PD 120 in blocks 611-618, and where flowchart 602 includes steps for then unlocking the DO-PD locked according to the steps of flowchart 601 in blocks 620-636. The third embodiment exclusive self-escrow method is generally similar to the previous embodiment exclusive self-escrow methods, except as explicitly stated.

DO-PD 120 may be locked according to the steps of flowchart 601, as per blocks 122, 123, and 124, as follows:

In block 611, TPP-'PD 110 creates a TPP key pair as a TPP private key and a TPP public key, creates a symmetric TPP key pair as a symmetric TPP private key and a symmetric TPP public key, and TPP-'PD 110 provides TPP public key and the symmetric TPP public key to DO-PD 120.

In block 612, after DO 20 engages with DO-PD 120, DO-PD 120, using P, creates a PD key pair as a PD private key and a PD public key, and creates a symmetric PD key pair as a symmetric PD private key and a symmetric PD public key.

In block 613, DO-PD 120, using P, creates a first escrow shared secret key (ESSK #1) using the symmetric PD private key and the symmetric TPP public key.

In block 614, DO-PD 120, using P, hashes ESSK #1 to form credential escrow passcode #1.

In block 615, DO-PD 120 stores escrow passcode #1 to the hardware secure area (HSA) within memory 233.

In block 616, DO-PD 120 encrypts the symmetric PD public Key using TPP public key to form a message #1.

In block 617, DO-PD 120 stores the message #1, the PD private key, PD public key, and TPP public key in the DO-PD 120.

In block 618, DO-PD 120 deletes the symmetric PD key pair, the ESSK #1, and the escrow passcode #1 from the DO-PD 120.

After the execution of block 618, DO-PD 120 is locked according to the third embodiment exclusive self-escrow method.

The DO-PD 120 locked according to the steps of flowchart 601 may be unlocked according to the steps of flowchart 602, as per blocks 125, 126, 127, and 128, as follows:

In block 620, TPP-'PD 110 receives a validated unlock request, as per block 113.

In block 621, TPP-'PD 110, using P, places program domain into escrow mode, as per block 125 and retrieves the message #1 and the PD public key from the DO-PD 120.

In block 622, TPP-'PD 110, using P, creates a temp TPP private key and a temp TPP public key, and RND #1.

In block 623, TPP-'PD 110, using P, encrypts the Temp TPP public key and RND #1 using the PD public key to form a message #2, and releases message #2 to DO-PD 120.

In block 624, DO-PD 120, using P, decrypts message #2 using PD private key to reveal the temp TPP public key and RND #1.

In block 625, DO-PD 120, using P, renames RND #1 from block 624 as a RND #2.

In block 626, DO-PD 120, using P, encrypts RND #2 using the temp TPP public key to form a message #3, and releases the message #3 to TPP-'PD 110.

In block 627, TPP-'PD 110, using P, decrypts message #3 using temp TPP private key to reveal RND #2.

Block 628 then performs a test whereby TPP-'PD 110 authenticates DO-PD 120. Specifically, TPP-'PD 110, using P, compares the resident credential RND #1 from block 622 and challenge credential RND #2 from block 627. If the correct keys have been used in the determining of the credentials, then at block 628, RND #1 and RND #2 are identical. Thus, in block 628, TPP-'PD 110, using P, compares RND #1 to RND #2. If RND #1 equals RND #2 then DO-PD 120 is authenticated to TPP-'PD 110, and the result of block 628 is "Y," and if RND #1 does not equal RND #2 then the authentication has failed and the result of block 628 is "N."

If the result of block 628 is "N," then the authentication has failed and execution of the unlocking of DO-PD 120 stops at block 629.

If the result of block 628 is "Y," then then DO-PD 120 is authenticated to TPP-'PD 110 and the unlocking proceeds to block 630, where TPP-PD 112, using P, decrypts message #1 using TPP Private key to reveal symmetric PD public key.

In block 631, TPP-PD 112, using P, computes ESSK #2 from symmetric PD public key and symmetric TPP private key.

In block 632, TPP-PD 112, using P, hashes ESSK #2 to form an escrow passcode #2.

In block 633, TPP-PD 112, using P, provides escrow passcode #2 to DO-PD 120.

Block 634 then performs a test whereby DO-PD 120 authenticates TPP-'PD 110 as the authentic, true provider of DO-PD 120. Specifically, DO-PD 120, using P, compares the resident credential escrow passcode #1 from block 615 and challenge credential escrow passcode #2 from block 633. If the correct keys have been used in the determining of the credentials, then at block 634, escrow passcode #1 and escrow passcode #2 are identical. Thus, in block 634, DO-PD 120, using P, compares escrow passcode #1 to escrow passcode #2. If escrow passcode #1 equals escrow passcode #2 then TPP-'PD 110 is the authenticated to DO-PD 120 and the result of block 634 is "Y," and if escrow passcode #1 does not equal escrow passcode #2 then the result of block 634 is "N."

If the result of block 634 is "N," then a step of the authentication has failed and execution of the unlocking of DO-PD 120 stops at block 635.

If the result of block 634 is "Y," then all authentications have passed, and the unlocking proceeds to block 636, where DO-PD 120, using P, unlocks the DO-PD.

With DO-PD 120 unlocked the GA can now access the DO-PD, per the warrant for the device.

Fourth Embodiment

Figure 7:
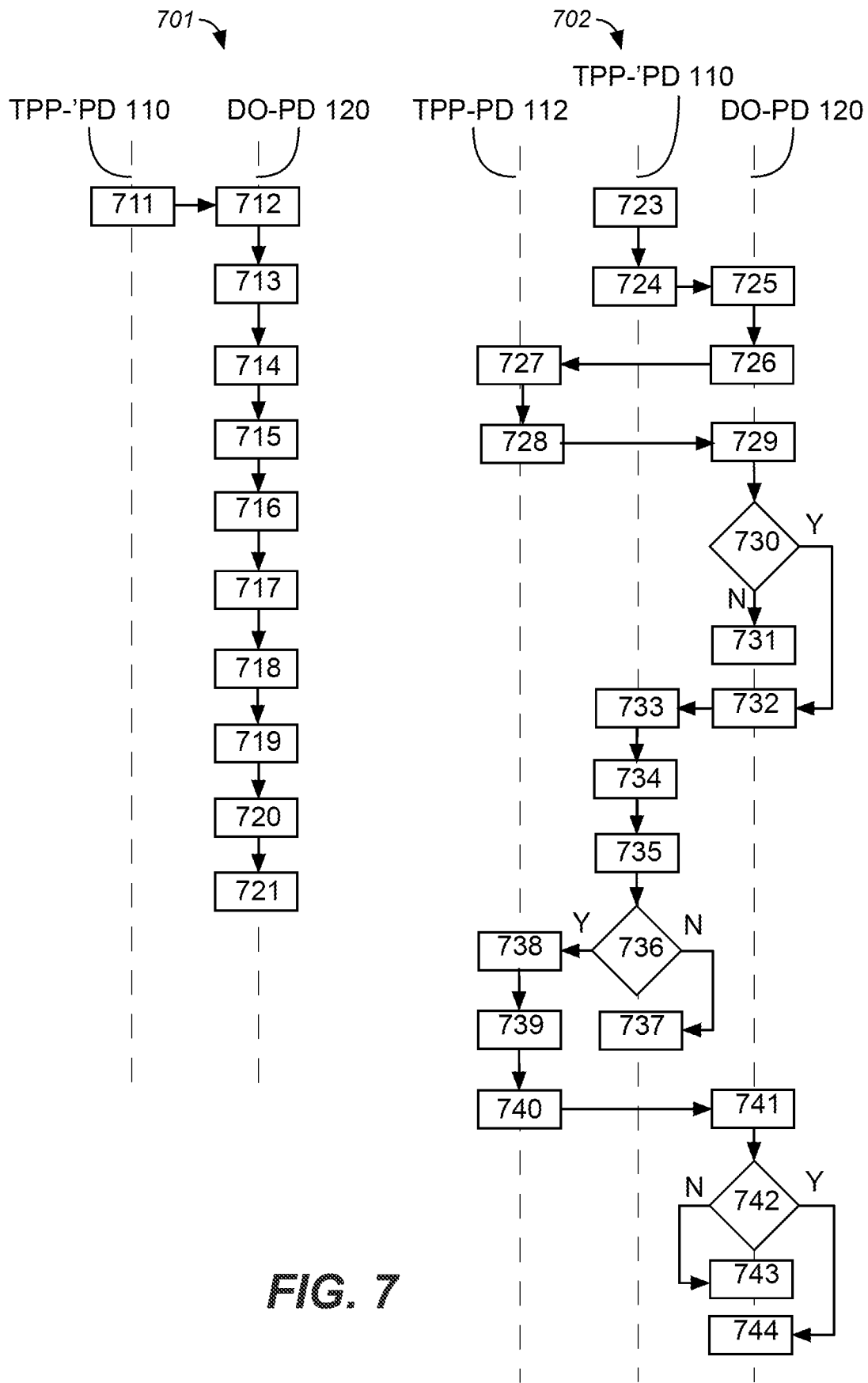
FIG. 7 is a flowchart of a fourth embodiment exclusive self-escrow method.

A fourth embodiment exclusive self-escrow method is shown in FIG. 7 as a flowchart 701 and a flowchart 702, where flowchart 601 includes steps for locking DO-PD 120 in blocks 711-721, and where flowchart 702 includes steps for then unlocking the DO-PD locked according to the steps of flowchart 701 in blocks 723-744. The fourth embodiment exclusive self-escrow method is generally similar to the previous embodiment exclusive self-escrow methods, except as explicitly stated.

DO-PD 120 may be locked according to the steps of flowchart 701, as per blocks 122, 123, and 124, as follows:

In block 711, TPP-'PD 110 creates a TPP key pair as a TPP private key and a TPP public key, creates a symmetric TPP key pair as a symmetric TPP private key and a symmetric TPP public key, and provides the TPP public key and the symmetric TPP public key to DO-PD 120.

In block 712, after DO 20 engages with DO-PD 120, DO-PD 120, using P, creates a symmetric PD domain key pair #1 as a symmetric PD private key #1 and a symmetric PD public key #1, creates a symmetric PD key pair #2 as a symmetric PD private key #2 and a symmetric PD public key #2, and creates a symmetric PD key pair #3 as a symmetric PD private key #3 and symmetric PD public key #3.

In block 713, DO-PD 120, using P, creates a shared secret key, ESSK #1, using symmetric PD private key #1 and symmetric TPP public key.

In block 714, DO-PD 120, using P, hashes ESSK #1 to form escrow passcode #1.

In block 715, DO-PD 120, using P, creates a first shared secret key, SSK #1, using symmetric PD private key #2 and TPP public key.

In block 716, DO-PD 120, using P, creates a second shared secret key, SSK #2, using symmetric PD private key #3 and TPP public key.

In block 717, DO-PD 120, using P, hashes SSK #1 to form a HSSK #1, and hashes SSK #2 to form a HSSK #2.

In block 718, DO-PD 120, using P, encrypts escrow passcode #1 using SSK #1 to form a message #1.

In block 719, DO-PD 120, using P, encrypts symmetric PD public key #1, symmetric PD public key #2, symmetric PD public key #3, and HSSK #1 using TPP public key to from a message #2.

In block 720, DO-PD 120, using P, stores message #1, message #2 and HSSK #2 in memory 233 of DO-PD 120.

In block 721, DO-PD 120, using P, deletes escrow passcode #1, symmetric PD private key #1, symmetric PD private key #2, symmetric PD private key #3, symmetric PD public key #1, symmetric PD public key #2, symmetric PD public key #3, SSK #1, SSK #2, and HSSK #1.

After the execution of block 721, DO-PD 120 is locked according to the fourth embodiment exclusive self-escrow method.

The DO-PD 120 locked according to the steps of flowchart 701 may be unlocked according to the steps of flowchart 702, as per blocks 125, 126, 127, and 128, as follows:

In block 723, TPP-'PD 110 receives a validated unlock request, as per block 113.

In block 724, TPP-'PD 110, using P, places DO-PD 120 into escrow mode, as per block 125.

In block 725, DO-PD 120, using P, creates a PD key pair as a PD private key and a PD public key.

In block 726, DO-PD 120, using P, stores an identification number of the DO-PD, ID #1, and encrypts ID #1 and the PD public key using TPP public key to form a message #3, and releases the TPP public key and the message #3 to TPP-PD 112.

In block 727, TPP-PD 112, using P, decrypts message #3 using TPP private key revealing the ID #1, which is renamed as ID #2, and the PD public key.

In block 728, TPP-PD 112 using P, encrypts ID #2 using PD public key to form a message #4, and releases the message #4 to DO-PD 120.

In block 729, DO-PD 120 decrypts the message #4 using the PD private key to reveal ID #2.

Block 730 then performs a test whereby DO-PD 120 authenticates TPP-'PD 110 as the authentic, true provider of DO-PD 120. Specifically, DO-PD 120, using P, compares the resident credential ID #1 from block 726 and challenge credential ID #2 from block 729. If the correct keys have been used in the determining of the credentials, then at block 730, ID #1 and ID #2 are identical. Thus, in block 730, DO-PD 120, using P, compares ID #1 to ID #2. If ID #1 equals ID #2 then TPP-'PD 110 is the authenticated to DO-PD 120 and the result of block 730 is "Y," and if ID #1 does not equal ID #2 then the result of block 730 is "N."

If the result of block 730 is "N," then a step of the authentication has failed and execution of the unlocking of DO-PD 120 stops at block 731.

If the result of block 730 is "Y," then TPP-'PD 110 is the authenticated to DO-PD 120, and the unlocking proceeds to block 733, where TPP-'PD 110, using P, decrypts the message #2 using TPP private key to reveal the symmetric PD public key #1, the symmetric PD public key #2, the symmetric PD public key #3, and the HSSK #1.

In block 734, TPP-'PD 110, using P, creates a SSK #3 using TPP private key and the symmetric PD public key #2.

In block 735, TPP-'PD 110, using P, hashes the SSK #3 to form a HSSK #3.

Block 736 then performs a test whereby TPP-'PD 110 authenticates DO-PD 120. Specifically, TPP-'PD 110, using P, compares the resident credential HSSK #1 from block 733 and challenge credential HSSK #3 from block 735. If the correct keys have been used in the determining of the credentials, then at block 736, HSSK #1 and HSSK #3 are identical. Thus, in block 736, TPP-'PD 110, using P, compares HSSK #1 to HSSK #3. If HSSK #1 equals HSSK #3 then DO-PD 120 is authenticated to TPP-'PD 110, and the result of block 736 is "Y," and if HSSK #1 does not equal HSSK #3 then the authentication has failed and the result of block 736 is "N."

If the result of block 736 is "N," then the authentication has failed and execution of the unlocking of DO-PD 120 stops at block 737.

If the result of block 736 is "Y," then then DO-PD 120 is authenticated to TPP-'PD 110 and the unlocking proceeds to block 738, where TPP-PD 112 computes an shared secret key, ESSK #2, using the symmetric PD public key #1 and the symmetric TPP private key.

In block 739, TPP-PD 112, using P, hashes ESSK #2 to form an escrow passcode #2.

In block 740, TPP-PD 112 releases SSK #3 and escrow passcode #2 to DO-PD 120.

In block 741, DO-PD 120, using P, decrypts message #1 using SSK #3 to reveal escrow passcode #1.

Block 742 then performs a second test whereby DO-PD 120 authenticates TPP-'PD 110. The second authentication of the TPP is performed to account for the additional time and activity of authenticating additional third parties. Specifically, DO-PD 120, using P, compares the resident credential escrow passcode #1 from block 741 and challenge credential escrow passcode #2 from block 740. If the correct keys have been used in the determining of the credentials, then at block 742, escrow passcode #1 and escrow passcode #2 are identical. Thus, in block 742, DO-PD 120, using P, compares escrow passcode #1 to escrow passcode #2. If escrow passcode #1 equals escrow passcode #2 then TPP-'PD 110 is the authenticated to DO-PD 120 and the result of block 742 is "Y," and if escrow passcode #1 does not equal escrow passcode #2 then the result of block 742 is "N."

If the result of block 742 is "N," then a step of the authentication has failed and execution of the unlocking of DO-PD 120 stops at block 743.

If the result of block 742 is "Y," then the authentication steps have all been successful, and the unlocking proceeds to block 744, where DO-PD 120, using P, unlocks the DO-PD.

With DO-PD 120 unlocked the GA can now access the DO-PD, per the warrant for the device.

Fifth Embodiment

Figure 8:
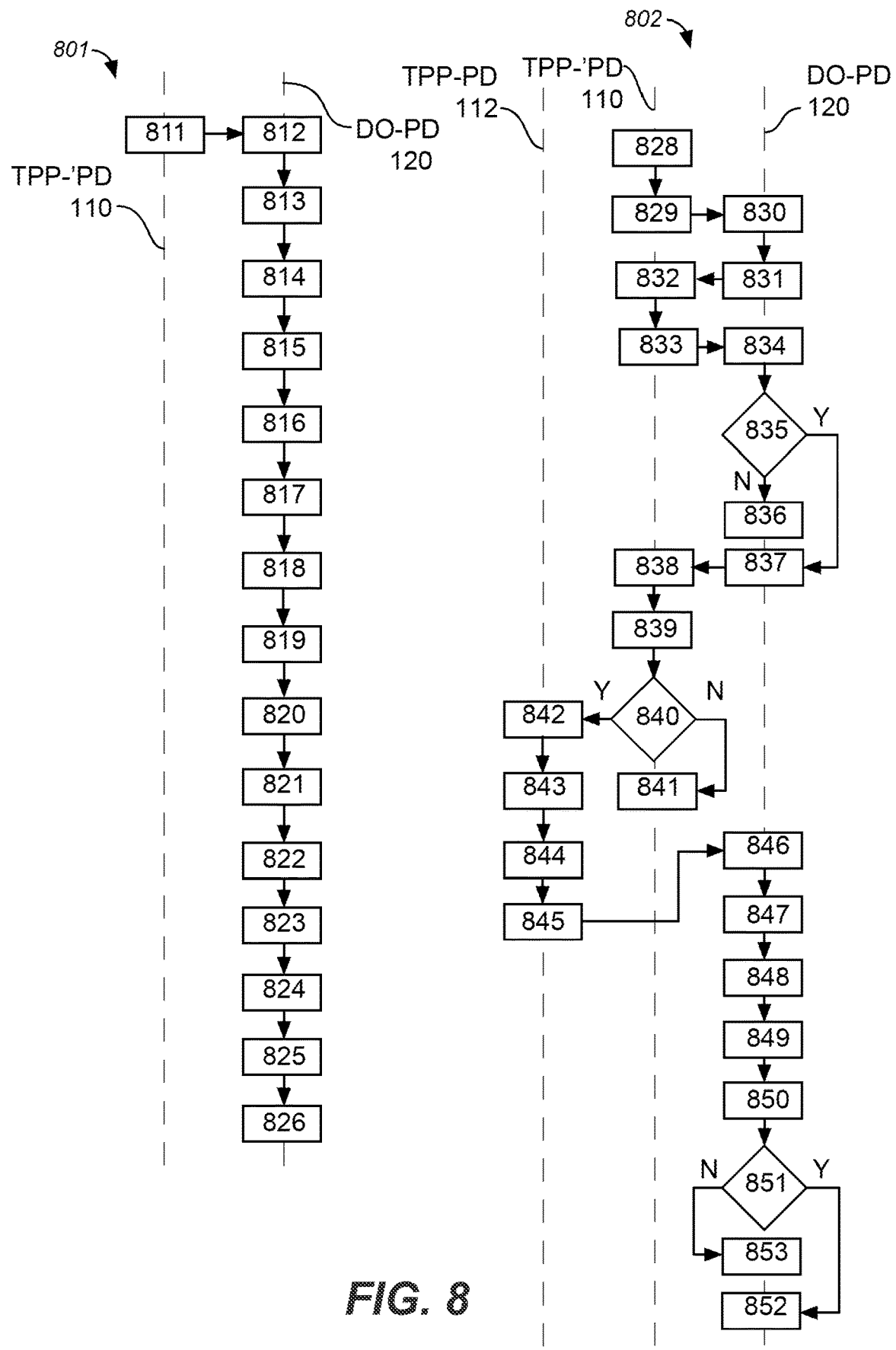
FIG. 8 is a flowchart of a fifth embodiment exclusive self-escrow method.

A fifth embodiment exclusive self-escrow method is shown in FIG. 8 as a flowchart 801 and a flowchart 802, where flowchart 801 includes steps for locking DO-PD 120 in blocks 811-826, and where flowchart 802 includes steps for then unlocking the DO-PD locked according to the steps of flowchart 801 in blocks 828-852. The fifth embodiment exclusive self-escrow method is generally similar to the previous embodiment exclusive self-escrow methods, except as explicitly stated.

DO-PD 120 may be locked according to the steps of flowchart 801, as per blocks 122, 123, and 124, as follows:

In block 811 TPP-'PD 110 creates a TPP key pair as a TPP private key and a TPP public key, creates a symmetric TPP key pair as a symmetric TPP private key and a symmetric TPP public key, and provides TPP public key and the symmetric TPP public key to DO-PD 120.

In block 812, after DO 20 engages with DO-PD 120, DO-PD 120, using P, creates a symmetric PD key pair #1 as a symmetric PD private key #1 and a symmetric PD public key #1, creates a symmetric key pair #2 as a symmetric PD private key #2 and a symmetric PD public key #2, creates a symmetric key pair #3 as a symmetric PD private key #3 and a symmetric PD public key #3, and creates a symmetric key pair #4 as a symmetric PD private key #4 and a symmetric PD public key #4.

In block 813, DO-PD 120, using P, creates an escrow shared secret key, ESSK #1, from the symmetric PD private key #1 and the symmetric TPP public key.

In block 814, DO-PD 120, using P, hashes ESSK #1 to form an escrow passcode.

In block 815, DO-PD 120, using P, copies escrow passcode to a escrow passcode #1copy #1.

In block 816, DO-PD 120, using P, creates a shared secret key, SSK #3, using the symmetric PD private key #3 and the symmetric TPP public key.

In block 817, DO-PD 120, using P, creates shared secret key SSK #4 using the symmetric PD private key #4 and the symmetric TPP public key.

In block 818, DO-PD 120, using P, hashes SSK #3 to form HSSK #1, and hashes SSK #4 to form HSSK #2.

In block 819, DO-PD 120, using P, copies symmetric PD private key #2 to symmetric PD private key #2copy #1.

In block 820, DO-PD 120, using P, encrypts symmetric PD private key #2copy #1 using ESSK #1 to form message #2.

In block 821, DO-PD 120, using P, creates a shared secret key, SSK #2, using the symmetric PD private key #2 and the symmetric PD public key #2.

In block 822, DO-PD 120, using P, encrypts symmetric PD public key #2, symmetric PD public key #3, symmetric PD public key #4, HSSK #1 using TPP public key to form a message #4.

In block 823, DO-PD 120, using P, encrypts symmetric PD private key #1 using TPP public key to form a message #5.

In block 824 DO-PO 120, using P, encrypts escrow passcode #1copy #1 using SSK #2 to form a message #1.

In block 825, DO-PD 120, using P, deletes the symmetric PD private key #1, the symmetric PD private key #2, the symmetric PD private key #3, the symmetric PD private key #4, the symmetric PD public key #1, the symmetric PD public key #2, the symmetric PD public key #3, the symmetric PD public key #4, the ESSK #1, the SSK #2, and the escrow passcode.

In block 826 DO-PO 120, using P, stores message #1, message #2, message #4, message #5 and HSSK #2 in DO-PD 120.

After the execution of block 826, DO-PD 120 is locked according to the fifth embodiment exclusive self-escrow method.

The DO-PD 120 locked according to the steps of flowchart 801 may be unlocked according to the steps of flowchart 802, as per blocks 125, 126, 127, and 128, as follows:

In block 828, TPP-'PD 110 receives a validated unlock request, as per block 113.

In block 829, TPP-'PD 110, using P, places DO-PD 120 into escrow mode, as per block 125.

In block 830, DO-PD 120, using P, creates a PD key pair as a PD private key and a PD public key.

In block 831, DO-PD 120, using P, creates a random number, RND #1, encrypts the RND #1 and PD public key using TPP public key to form a message #6, and releases TPP public key and message #6 to TPP-'PD 110.

In block 832, TPP-'PD 110 using P, decrypts message #6 using TPP private key to reveal RND #1, which is stored as a RND #2, and the PD public key.

In block 833, TPP-'PD 110 using P, encrypts RND #2 using PD public key to form a message #7, and releases the message #7 to the DO-PD 120.

In block 834, DO-PD 120 decrypts message #7 using the PD private key to reveal RND #2.

Block 835 then performs a test whereby DO-PD 120 authenticates TPP-'PD 110 as the authentic, true provider of DO-PD 120. Specifically, DO-PD 120, using P, compares the resident credential RND #1 from block 831 and challenge credential RND #2 from block 834. If the correct keys have been used in the determining of the credentials, then at block 835, RND #1 and RND #2 are identical. Thus, in block 835, DO-PD 120, using P, compares RND #1 to RND #2. If RND #1 equals RND #2 then TPP-'PD 110 is the authenticated to DO-PD 120 and the result of block 835 is "Y," and if RND #1 does not equal RND #2 then the result of block 835 is "N."

If the result of block 836 is "N," then a step of the authentication has failed and execution of the unlocking of DO-PD 120 stops at block 836.

If the result of block 836 is "Y," then TPP-'PD 110 is the authenticated to DO-PD 120, and the unlocking proceeds to block 837, where DO-PD 120, using P, releases message #4 and message #5 to TPP-PD 110.

In block 838, TPP-'PD 110, using P, decrypts message #4 using TPP private key to reveal the symmetric PD public key #2, the symmetric PD public key #3, the symmetric PD public key #4 and the HSSK #1 and also creates a shared secret key, SSK #5, using the symmetric TPP private key and the symmetric PD public key #3.

In block 839, TPP-'PD 110, using P, hashes SSK #5 to form HSSK #3.

Block 840 then performs a test whereby TPP-'PD 110 authenticates DO-PD 120. Specifically, TPP-'PD 110, using P, compares the resident credential HSSK #1 from block 838 and challenge credential HSSK #3 from block 839. If the correct keys have been used in the determining of the credentials, then at block 840, HSSK #1 and HSSK #3 are identical. Thus, in block 840, TPP-'PD 110, using P, compares HSSK #1 to HSSK #3. If HSSK #1 equals HSSK #3 then DO-PD 120 is authenticated to TPP-'PD 110, and the result of block 840 is "Y," and if HSSK #1 does not equal HSSK #2 then the authentication has failed and the result of block 840 is If the result of block 840 is "N," then the authentication has failed and execution of the unlocking of DO-PD 120 stops at block 841.

If the result of block 840 is "Y," then then DO-PD 120 is authenticated to TPP-'PD 110 and the unlocking proceeds to block 842, where TPP-PD 112 decrypts message #5 using TPP private key to reveal the symmetric PD private key #1.

In block 843, TPP-PD 112, using P, creates a shared secret key, SSK #6, using TPP private key and the symmetric PD public key #4.

In block 844, TPP-PD 112, using P, creates a shared secret key, ESSK #3, using TPP private key and the symmetric PD public key #1.

In block 845, TPP-PD 112, using P, encrypts the symmetric PD private key #1 and the ESSK #3 using SSK #6 forming a message #3, and releases the SSK #6 and the message #3 to DO-PD 120.

In block 846, DO-PD 120, using P, decrypts message #3 using the SSK #6 to reveal the symmetric PD private key #1 and the ESSK #3.

In block 847, DO-PD 120 hashes the ESSK #3 to form an escrow passcode #2.

In block 848, DO-PD 120, using P, decrypts message #2 using the ESSK #3 to reveal the symmetric PD private key #2copy #1.

In block 849, DO-PD 120, using P, creates a shared secret key, SSK #2 from the symmetric PD private key #2copy #1 and the symmetric PD public key #2.

In block 850, DO-PD 120, using P, decrypts the message #1 using the SSK #2 to reveal the escrow passcode #1copy #1, which is stored as escrow passcode #1.

Block 851 then performs a second test whereby DO-PD 120 authenticates TPP-'PD 110. to account for the additional time and activity of authenticating additional third parties. Specifically, DO-PD 120, using P, compares the resident credential escrow passcode #1 from block 850 and challenge credential escrow passcode #2 from block 847. If the correct keys have been used in the determining of the credentials, then at block 851, escrow passcode #1 and escrow passcode #2 are identical. Thus, in block 851, DO-PD 120, using P, compares escrow passcode #1 to escrow passcode #2. If escrow passcode #1 equals escrow passcode #2 then TPP-'PD 110 is the authenticated to DO-PD 120 and the result of block 851 is "Y," and if escrow passcode #1 does not equal escrow passcode #2 then the result of block 851 is "N."

If the result of block 851 is "N," then a step of the authentication has failed and execution of the unlocking of DO-PD 120 stops at block 853.

If the result of block 851 is "Y," then all authentications have passed, and the unlocking proceeds to block 852, where DO-PD 120, using P, unlocks the DO-PD.

With DO-PD 120 unlocked the GA can now access the DO-PD, per the warrant for the device.

Sixth Embodiment

Figure 9:
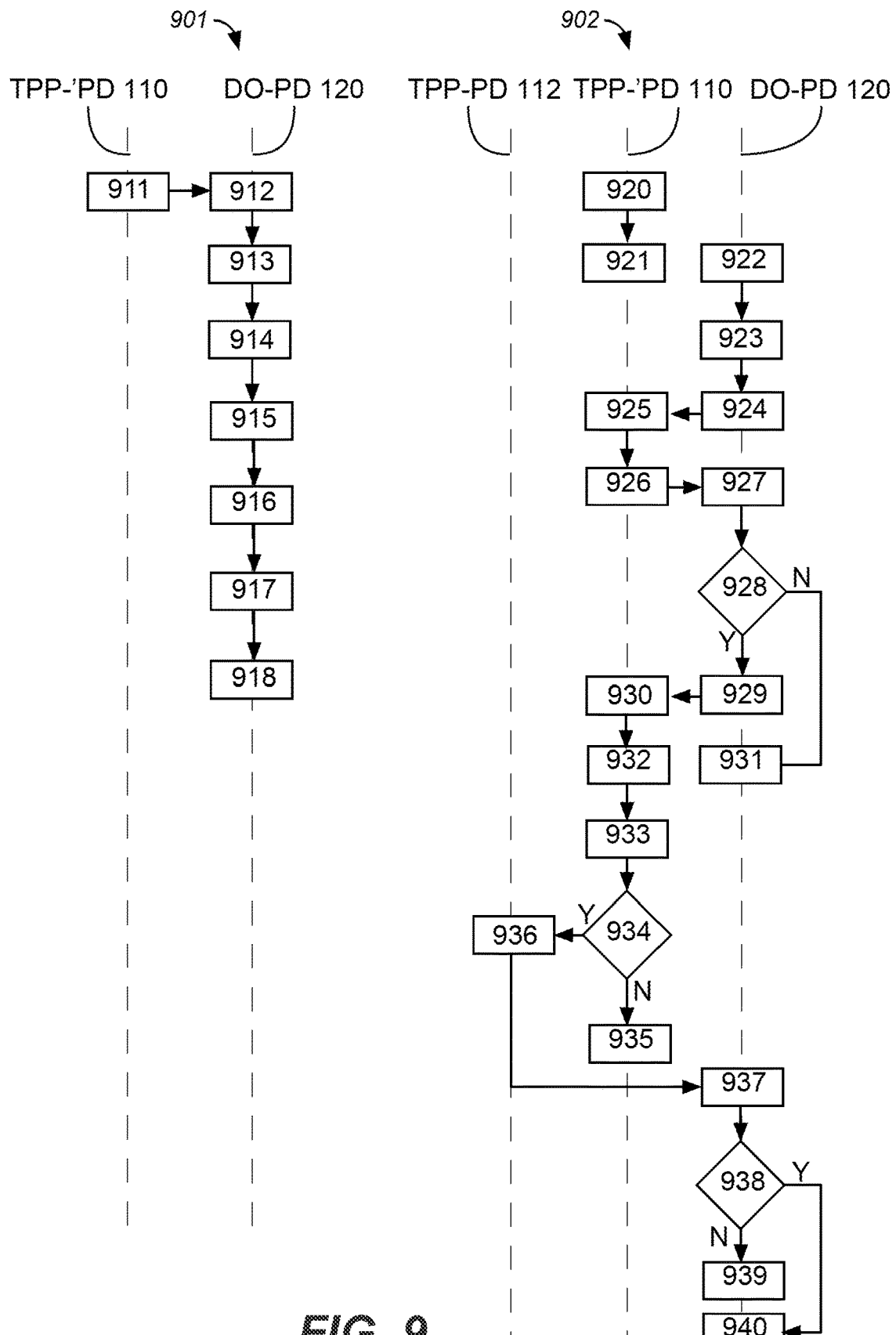
FIG. 9 is a flowchart of a sixth embodiment exclusive self-escrow method.

A sixth embodiment exclusive self-escrow method is shown in FIG. 9 as a flowchart 901 and a flowchart 902, where flowchart 901 includes steps for locking DO-PD 120 in blocks 911-918, and where flowchart 902 includes steps for then unlocking the DO-PD locked according to the steps of flowchart 901 in blocks 920-940. The sixth embodiment exclusive self-escrow method is generally similar to the previous embodiment exclusive self-escrow methods, except as explicitly stated.

DO-PD 120 may be locked according to the steps of flowchart 901, as per blocks 122, 123, and 124, as follows:

In block 911 TPP-'PD 110 creates a TPP key pair as a TPP private key and a TPP public key, creates a symmetric TPP key pair as a symmetric TPP private key and a symmetric TPP public key, and provides TPP public key and the symmetric TPP public key to DO-PD 120.

In block 912, after DO 20 engages with DO-PD 120, DO-PD 120, using P, creates a symmetric PD key pair #1 as a symmetric PD private key #1 and a symmetric PD public key #1, and creates a symmetric PD key pair #2 as a symmetric PD private key #2 and a symmetric PD public key #2.

In block 913, DO-PD 120, using P, creates a shared secret key, SSK #1 using the symmetric PD private key #1 and the symmetric TPP public key.

In block 914, DO-PD 120, using P, creates a shared secret key, SSK #2, using the symmetric PD private key #2 and the symmetric TPP public key.

In block 915, DO-PD 120, using P, hashes SSK #1 to form HSSK #1, and hashes SSK #2 to form HSSK #2.

In block 916, DO-PD 120, using P, encrypts the symmetric PD public key #1, the symmetric PD public key #2, and the HSSK #1, using TPP public key, into a message #1.

In block 917, DO-PD 120, using P, stores the message #1 and the HSSK #2.

In block 918, DO-PD 120, using P, deletes the symmetric PD key pair #1, symmetric PD key pair #2, SSK #1, SSK #2, HSSK #1.

After the execution of block 918, DO-PD 120 is locked according to the sixth embodiment exclusive self-escrow method.

The DO-PD 120 locked according to the steps of flowchart 901 may be unlocked according to the steps of flowchart 902, as per blocks 125, 126, 127, and 128, as follows:

In block 920, TPP-'PD 110 receives a validated unlock request, as per block 113.

In block 921, TPP-'PD 110, using P, places DO-PD 120 into escrow mode, as per block 125.

In block 922, DO-PD 120 creates a symmetric PD key pair #3 as a symmetric PD private key #3 and a symmetric PD public key #3, and creates a PD key pair as a PD private key and a PD public key.

In block 923, DO-PD 120, using P, creates a shared secret key, SSK #5, using the symmetric PD private key #3 and the symmetric TPP public key.

In block 924, DO-PD 120, using P, releases the symmetric TPP public key, the PD public key and the symmetric PD public key #3 to TPP-'PD 110.

In block 925, TPP-'PD 110, using P, creates a shared secret key, SSK #6, using the symmetric PD public key #3 and the symmetric TPP private key.

In block 926, TPP-'PD 110, using P, encrypts the SSK #6 using the PD public key to form a message #2, and releases the message #2 to the DO-PD 120.

In block 927, DO-PD 120 decrypts message #2 using the PD private key to reveal the SSK #6.

Block 928 then performs a test whereby DO-PD 120 authenticates TPP-'PD 110 as the authentic, true provider of DO-PD 120. Specifically, DO-PD 120, using P, compares the resident credential SSK #5 from block 923 and challenge credential SSK #6 from block 927. If the correct keys have been used in the determining of the credentials, then at block 928, SSK #5 and SSK #6 are identical. Thus, in block 928, DO-PD 120, using P, compares SSK #5 to SSK #6. If SSK #5 equals SSK #6 then TPP-'PD 110 is the authenticated to DO-PD 120 and the result of block 928 is "Y," and if escrow passcode #1 does not equal escrow passcode #2 then the result of block 928 is "N."

If the result of block 928 is "N," then a step of the authentication has failed and execution of the unlocking of DO-PD 120 stops at block 931.

If the result of block 928 is "Y," then TPP-'PD 110 is the authenticated to DO-PD 120, and the unlocking proceeds to block 929, where DO-PD 120, using P, releases message #1 to TPP-'PD 110.

In block 930, TPP-'PD 110, using P, decrypts the message #1 using TPP private key to reveal the symmetric PD public key #1, the symmetric PD public key #2, and the HSSK #1.

In block 932, TPP-'PD 110, using P, creates a shared secret key, SSK #3, using the symmetric TPP private key and the symmetric PD public key #1.

In block 933, TPP-'PD 110, using P, hashes SSK #3 to form a HSSK #3.

Block 934 then performs a test whereby TPP-'PD 110 authenticates DO-PD 120. Specifically, TPP-'PD 110, using P, compares the resident credential HSSK #1 from block 930 and challenge credential HSSK #3 from block 933. If the correct keys have been used in the determining of the credentials, then at block 934, HSSK #1 and HSSK #3 are identical. Thus, in block 934, TPP-'PD 110, using P, compares HSSK #1 to HSSK #3. If HSSK #1 equals HSSK #3 then DO-PD 120 is authenticated to TPP-'PD 110, and the result of block 934 is "Y," and if HSSK #1 does not equal HSSK #3 then the authentication has failed and the result of block 934 is "N."

If the result of block 934 is "N," then the authentication has failed and execution of the unlocking of DO-PD 120 stops at block 935.

If the result of block 934 is "Y," then then DO-PD 120 is authenticated to TPP-'PD 110 and the unlocking proceeds to block 936, where TPP-PD 112 decrypts message #5 using TPP private key to reveal the symmetric PD private key #1.

In block 937, DO-PD 120, using P, hashes SSK #4 to form HSSK #4.

Block 938 then performs a second test whereby DO-PD 120 authenticates TPP-'PD 110. The second authentication of the TPP is performed to account for the additional time and activity of authenticating additional third parties. Specifically, DO-PD 120, using P, compares the resident credential HSSK #2 from block 917 and challenge credential HSSK #4 from block 937. If the correct keys have been used in the determining of the credentials, then at block 938, HSSK #2 and HSSK #4 are identical. Thus, in block 938, DO-PD 120, using P, compares HSSK #2 to HSSK #4. If HSSK #2 equals HSSK #4 then TPP-'PD 110 is the authenticated to DO-PD 120 and the result of block 938 is "Y," and if HSSK #2 does not equal HSSK #4 then the result of block 938 is "N."

If the result of block 938 is "N," then a step of the authentication has failed and execution of the unlocking of DO-PD 120 stops at block 939.

If the result of block 938 is "Y," then all authentications have passed, and the unlocking proceeds to block 940, where DO-PD 120, using P, unlocks the DO-PD.

With DO-PD 120 unlocked the GA can now access the DO-PD, per the warrant for the device.

Seventh Embodiment

Figure 10:
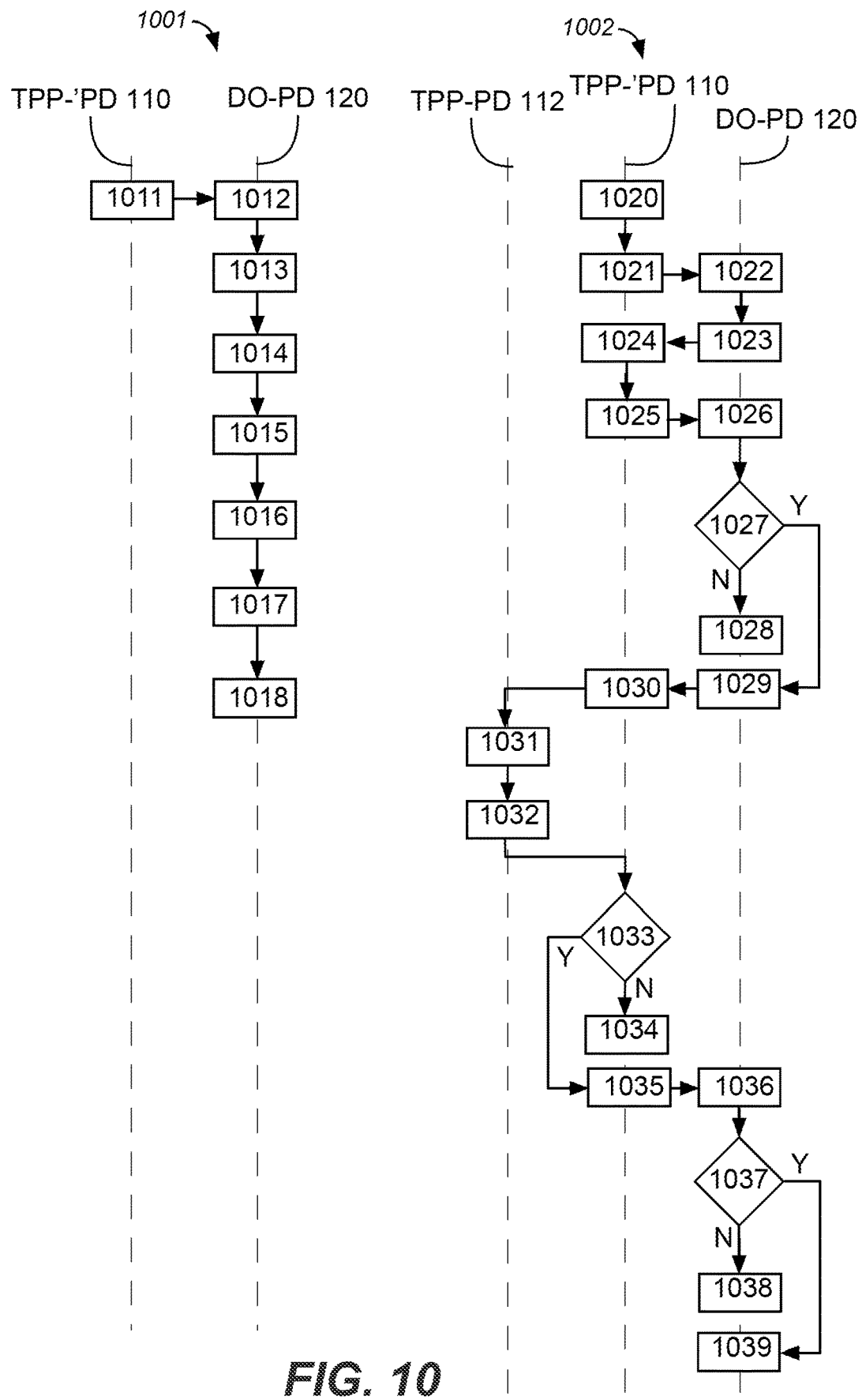
FIG. 10 is a flowchart of a seventh embodiment exclusive self-escrow method.

A seventh embodiment exclusive self-escrow method is shown in FIG. 10 as a flowchart 1001 and a flowchart 1002, where flowchart 1001 includes steps for locking DO-PD 120 in blocks 1101-1018, and where flowchart 1002 includes steps for then unlocking the DO-PD locked according to the steps of flowchart 1001 in blocks 1020-1039. The seventh embodiment exclusive self-escrow method is generally similar to the previous embodiment exclusive self-escrow methods, except as explicitly stated.

DO-PD 120 may be locked according to the steps of flowchart 1001, as per blocks 122, 123, and 124, as follows:

In block 1011, TPP-'PD 110 creates a TPP key pair as a TPP private key and a TPP public key, creates a symmetric TPP key pair as a symmetric TPP private key and a symmetric TPP public key, and provides the TPP public key and symmetric TPP public key to DO-PD 120.

In block 1012, after DO 20 engages with DO-PD 120, DO-PD 120, using P, creates a symmetric PD key pair as a symmetric PD private key and a symmetric PD public key.

In block 1013, DO-PD 120, using P, creates SSK #1, using symmetric PD private key and symmetric TPP public key.

In block 1014, DO-PD 120, using P, creates a random number, RND #1.

In block 1015, DO-PD 120, using P, hashes SSK #1 into HSSK #1, and hashes RND #1 into HRND #2.

In block 1016, DO-PD 120, using P, encrypts HSSK #1, RND #1 and symmetric PD public key into message #1, using TPP public key.

In block 1017, DO-PD 120, using P, stores message #1 and HRND #2 to DO-PD 120.

In block 1018, DO-PD 120, using P, destroys the symmetric PD key pair, SSK #1, HSSK #1 and RND #1.

After the execution of block 1018, DO-PD 120 is locked according to the seventh embodiment exclusive self-escrow method.

The DO-PD 120 locked according to the steps of flowchart 1001 may be unlocked according to the steps of flowchart 1002, as per blocks 125, 126, 127, and 128, as follows:

In block 1020, TPP-'PD 110 receives a validated unlock request, as per block 113.

In block 1021, TPP-'PD 110, using P, places PD into escrow mode, as per block 125.

In block 1022, the DO-PD 120, using P, creates a PD key pair as a PD private key and a PD public key, and hashes PD private key into a PD private key Hash #1.

In block 1023, the DO-PD 120, using P, encrypts PD public key and PD private key Hash #1 into message #2 using TPP public key, and releases TPP public key, and message #2 to TPP-'PD 110.

In block 1024, TTP-'PD 110, using P, decrypts message #2 using TPP private key to reveal PD public key and PD private key Hash #1, which is renamed as PD private key Hash #2.

In block 1025, TTP-'PD 110, using P, encrypts PD private key Hash #2 to message #3 using PD public key, and releases message #3 to the DO-PD 120.

In block 1026, the DO-PD 120 decrypts message #3 using PD private key revealing PD private key Hash #2.

Block 1027 then performs a test whereby DO-PD 120 authenticates TTP-'PD 110 as the authentic, true provider of DO-PD 120. Specifically, DO-PD 120, using P, compares the resident credential PD private key Hash #1 from block 1022 and challenge credential PD private key Hash #2 from block 1026. If the correct keys have been used in the determining of the credentials, then at block 1027, PD private key Hash #1 and PD private key Hash #2 are identical. Thus, in block 1027, DO-PD 120, using P, compares PD private key Hash #1 to PD private key Hash #2. If PD private key Hash #1 equals PD private key Hash #2 then TTP-'PD 110 is the authenticated to DO-PD 120 and the result of block 1027 is "Y," and if PD private key Hash #1 does not equal PD private key Hash #2 then the result of block 1027 is "N."

If the result of block 1027 is "N," then a step of the authentication has failed and execution of the unlocking of DO-PD 120 stops at block 1028.

If the result of block 1027 is "Y," then TTP-'PD 110 is the authenticated to DO-PD 120, and the unlocking proceeds to block 1029, where DO-PD 120, using P, releases message #1 to TPP-'PD 110.

In block 1030, TTP-'PD 110, using P, decrypts message #1 using TPP private key to reveal HSSK #1, RND #1, and symmetric PD public key.

In block 1031, TPP'PD, using P, creates SSK #2 using symmetric TPP private key and symmetric PD public key.

In block 1032, TPP-PD, using P, hashes SSK #2 into HSSK #2.

Block 1033 then performs a test whereby TTP-'PD 110 authenticates DO-PD 120. Specifically, TTP-'PD 110, using P, compares the resident credential HSSK #1 from block 1030 and challenge credential HSSK #2 from block 1032. If the correct keys have been used in the determining of the credentials, then at block 1033, HSSK #1 and HSSK #2 are identical. Thus, in block 1033, TTP-'PD 110, using P, compares HSSK #1 to HSSK #2. If HSSK #1 equals HSSK #2 then DO-PD 120 is authenticated to TTP-'PD 110, and the result of block 1033 is "Y," and if HSSK #1 does not equal HSSK #2 then the authentication has failed and the result of block 1033 is "N."

If the result of block 1033 is "N," then the authentication has failed and execution of the unlocking of DO-PD 120 stops at block 1034.

If the result of block 1033 is "Y," then then DO-PD 120 is authenticated to TTP-'PD 110 and the unlocking proceeds to block 1035, where TPP-PD 110, using P, releases RND #1 to the PD.

In block 1036, the DO-PD 120, using P, hashes RND #1 into HRND #1.

Block 1037 then performs a second test whereby DO-PD 120 authenticates TTP-'PD 110. Specifically, DO-PD 120, using P, compares the resident credential HRND #1 from block 1036 and challenge credential HRND #2 from block 1015. If the correct keys have been used in the determining of the credentials, then at block 1037, HRND #1 and HRND #2 are identical. Thus, in block 1037, DO-PD 120, using P, compares HRND #1 to HRND #2. If HRND #1 equals HRND #2 then TTP-'PD 110 is the authenticated to DO-PD 120 and the result of block 1037 is "Y," and if HRND #1 does not equal HRND #2 then the result of block 1037 is "N."

If the result of block 1037 is "N," then a step of the authentication has failed and execution of the unlocking of DO-PD 120 stops at block 1038.

If the result of block 1037 is "Y," then TTP-'PD 110 is the authenticated to DO-PD 120, and the unlocking proceeds to block 1039, where DO-PD 120, using P, unlocks the DO-PD.

With DO-PD 120 unlocked the GA can now access the DO-PD, per the warrant for the device.

Eighth Embodiment

Figure 11:
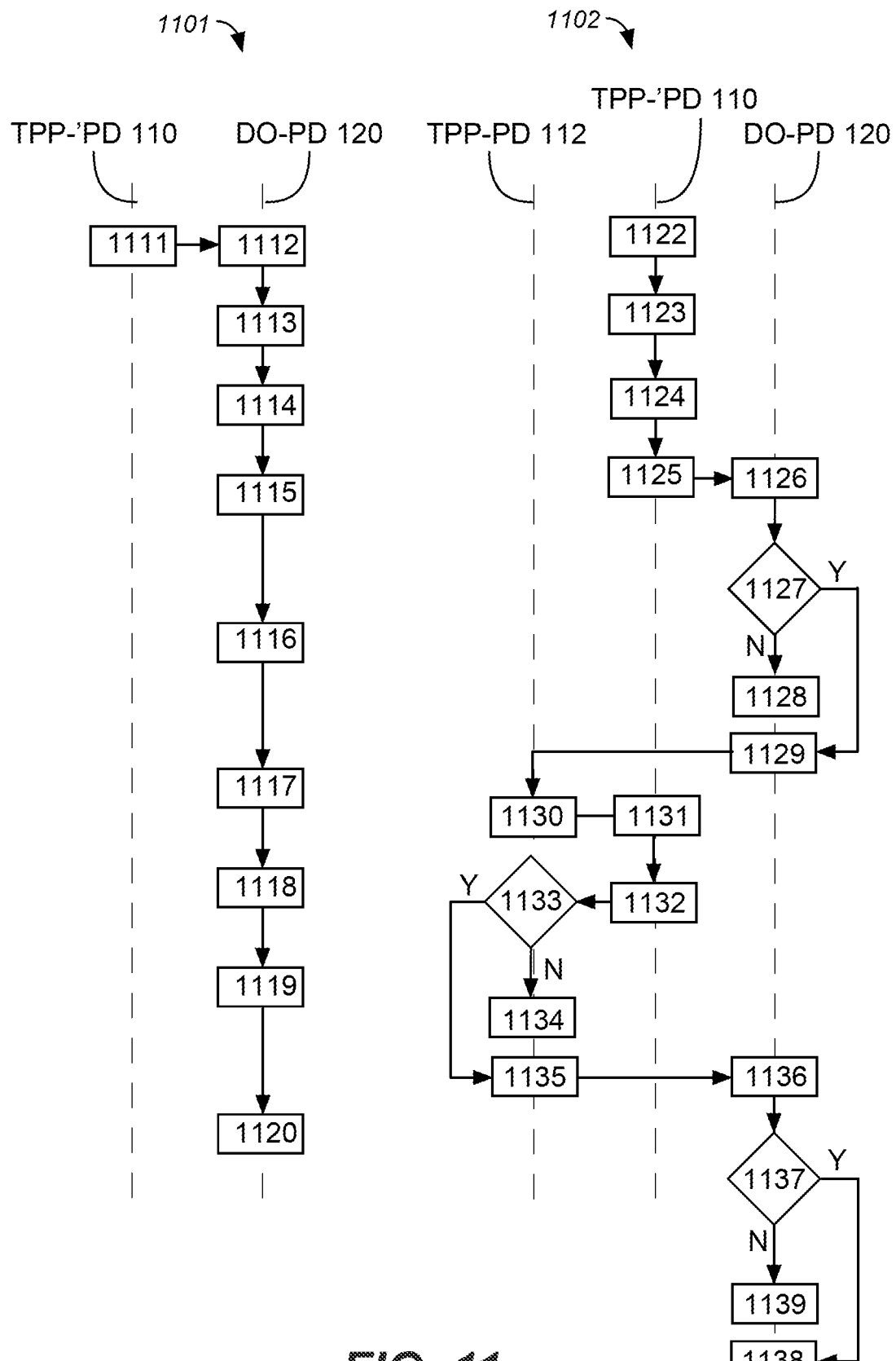
FIG. 11 is a flowchart of a eighth embodiment exclusive self-escrow method.

An eighth embodiment exclusive self-escrow method is shown in FIG. 11 as a flowchart 1101 and a flowchart 1102, where flowchart 1101 includes steps for locking DO-PD 120 in blocks 1111-1119, and where flowchart 1102 includes steps for then unlocking the DO-PD locked according to the steps of flowchart 1101 in blocks 1121-1138. The eighth embodiment exclusive self-escrow method is generally similar to the previous embodiment exclusive self-escrow methods, except as explicitly stated.

DO-PD 120 may be locked according to the steps of flowchart 1101, as per blocks 122, 123, and 124, as follows:

In block 1111, TPP-PD 110, using P, creates a TPP key pair as a TPP private key and a TPP public key, creates a symmetric TPP key pair as a symmetric TPP private key and a symmetric TPP public key, and provides the TPP public key and the symmetric TPP public key to DO-PD 120.

In block 1112, after DO 20 engages with DO-PD 120, the DO-PD 120, using P, creates a symmetric PD key pair #1 as a symmetric PD private key #1 and a symmetric PD public key #1, creates symmetric PD key pair #2 as a symmetric PD private key #2 and a symmetric PD public key #2, and creates a PD key pair as a PD private key and PD public key.

In block 1113, the DO-PD 120, using P, creates SSK #1, using symmetric PD private key #1 and symmetric TPP public key.

In block 1114, the DO-PD 120, using P, creates SSK #2, using symmetric PD private key #2 and symmetric TPP public key.

In block 1115, the DO-PD 120, using P, hashes SSK #1 into HSSK #1, and hashes SSK #2 into HSSK #2.

In block 1116, the DO-PD 120, using P, encrypts symmetric PD public key #1 and symmetric PD public key #2 into message #1 using TPP Public Key.

In block 1117, the DO-PD 120, using P, stores the passcode creation time in TIME #1.

In block 1118, the DO-PD 120, using P, encrypts TIME #1, PD private key. and PD public key into message #2 using TPP public key.

In block 1119, the DO-PD 120, using P, stores HSSK #1, HSSK #2, message #1, message #2, TIME #1, in DO-PD 120.

In block 1120, the DO-PD 120, using P, destroys the symmetric PD key pairs #1, symmetric PD key pairs #2, SSK #1, SSK #2, and PD private key.

After the execution of block 1120, DO-PD 120 is locked according to the eighth embodiment exclusive self-escrow method.

The DO-PD 120 locked according to the steps of flowchart 1101 may be unlocked according to the steps of flowchart 1102, as per blocks 125, 126, 127, and 128, as follows:

In block 1122, TPP-'PD 110 receives a validated unlock request, as per block 113.

In block 1123, TPP-'PD 110, using P, places PD into escrow mode, as per block 125, and releases message #2 to DO-PD 120.

In block 1124, TPP-'PD 110, using P, decrypts message #2 using the TPP private key to reveal the TIME #1, which is renamed as TIME #2, the PD Private Key and the PD public key.

In block 1125, TPP-'PD 110, using P, encrypts TIME #2 into a message #3 using the PD public key and releases the message #3 and the PD Private Key to the DO-PD 120.

In block 1126, the DO-PD 120, using P, decrypts the message #3 using the PD private key to reveal TIME #2.

Block 1127 then performs a test whereby DO-PD 120 authenticates TPP-'PD 110 as the authentic, true provider of DO-PD 120. Specifically, DO-PD 120, using P, compares the resident credential TIME #1 from block 1117 and challenge credential TIME #2 from block 1126. If the correct keys have been used in the determining of the credentials, then at block 1127, TIME #1 and TIME #2 are identical. Thus, in block 1127, DO-PD 120, using P, compares TIME #1 to TIME #2. If TIME #1 equals TIME #2 then TPP-'PD 110 is the authenticated to DO-PD 120 and the result of block 1127 is "Y," and if TIME #1 does not equal TIME #2 then the result of block 1127 is "N."

If the result of block 1127 is "N," then a step of the authentication has failed and execution of the unlocking of DO-PD 120 stops at block 1128.

If the result of block 1127 is "Y," then TPP-'PD 110 is the authenticated to DO-PD 120, and the unlocking proceeds to block 1129, where DO-PD 120, using P, releases message #1 to TPP-PD 112.

In block 1130, TPP-PD, using P, decrypts message #1 using TPP Private Key to reveal symmetric PD public key #1 and symmetric PD public key #2.

In block 1131, TPP-PD 110, using P, creates a SSK #3 using the symmetric TPP private key and the symmetric PD public key #1.

In block 1132, TPP-'PD 110, using P, hashes SSK #3 into a HSSK #3.

Block 1133 then performs a test whereby TPP-'PD 110 authenticates DO-PD 120. Specifically, TPP-'PD 110, using P, compares the resident credential HSSK #1 from block 1119 and challenge credential HSSK #3 from block 1132. If the correct keys have been used in the determining of the credentials, then at block 1133, HSSK #1 and HSSK #3 are identical. Thus, in block 1133, TPP-'PD 110, using P, compares HSSK #1 to HSSK #3. If HSSK #1 equals HSSK

3 then DO-PD 120 is authenticated to TPP-'PD 110, and the result of block 1133 is "Y," and if HSSK #1 does not equal HSSK #3 then the authentication has failed and the result of block 1133 is "N."

If the result of block 1133 is "N," then the authentication has failed and execution of the unlocking of DO-PD 120 stops at block 1134.

If the result of block 1133 is "Y," then then DO-PD 120 is authenticated to TPP-'PD 110 and the unlocking proceeds to block 1135, where TPP-PD 112, using P, creates a SSK #4 using the symmetric TPP private key and the symmetric PD public key #2 and releases SSK #4 to the DO-PD 120.

In block 1136, DO-PD 120, using P, hashes SSK #4 into HSSK #4.

Block 1137 then performs a test whereby DO-PD 120 authenticates TPP-'PD 110 as the authentic, true provider of DO-PD 120. Specifically, DO-PD 120, using P, compares the resident credential HSSK #2 from block 1119 and challenge credential HSSK #4 from block 1136. If the correct keys have been used in the determining of the credentials, then at block 1137, HSSK #2 and HSSK #4 are identical. Thus, in block 1137, DO-PD 120, using P, compares HSSK #2 and HSSK #4. If HSSK #2 equals HSSK #4 then TPP-'PD 110 is the authenticated to DO-PD 120 and the result of block 1137 is "Y," and if HSSK #2 does not equal HSSK #4 then the result of block 1137 is "N."

If the result of block 1137 is "N," then a step of the authentication has failed and execution of the unlocking of DO-PD 120 stops at block 1139.

If the result of block 1137 is "Y," then TPP-'PD 110 is the authenticated to DO-PD 120, and the unlocking proceeds to block 1138, where DO-PD 120, using P, unlocks the DO-PD.

With DO-PD 120 unlocked the GA can now access the DO-PD, per the warrant for the device.

Ninth Embodiment

Figure 12:
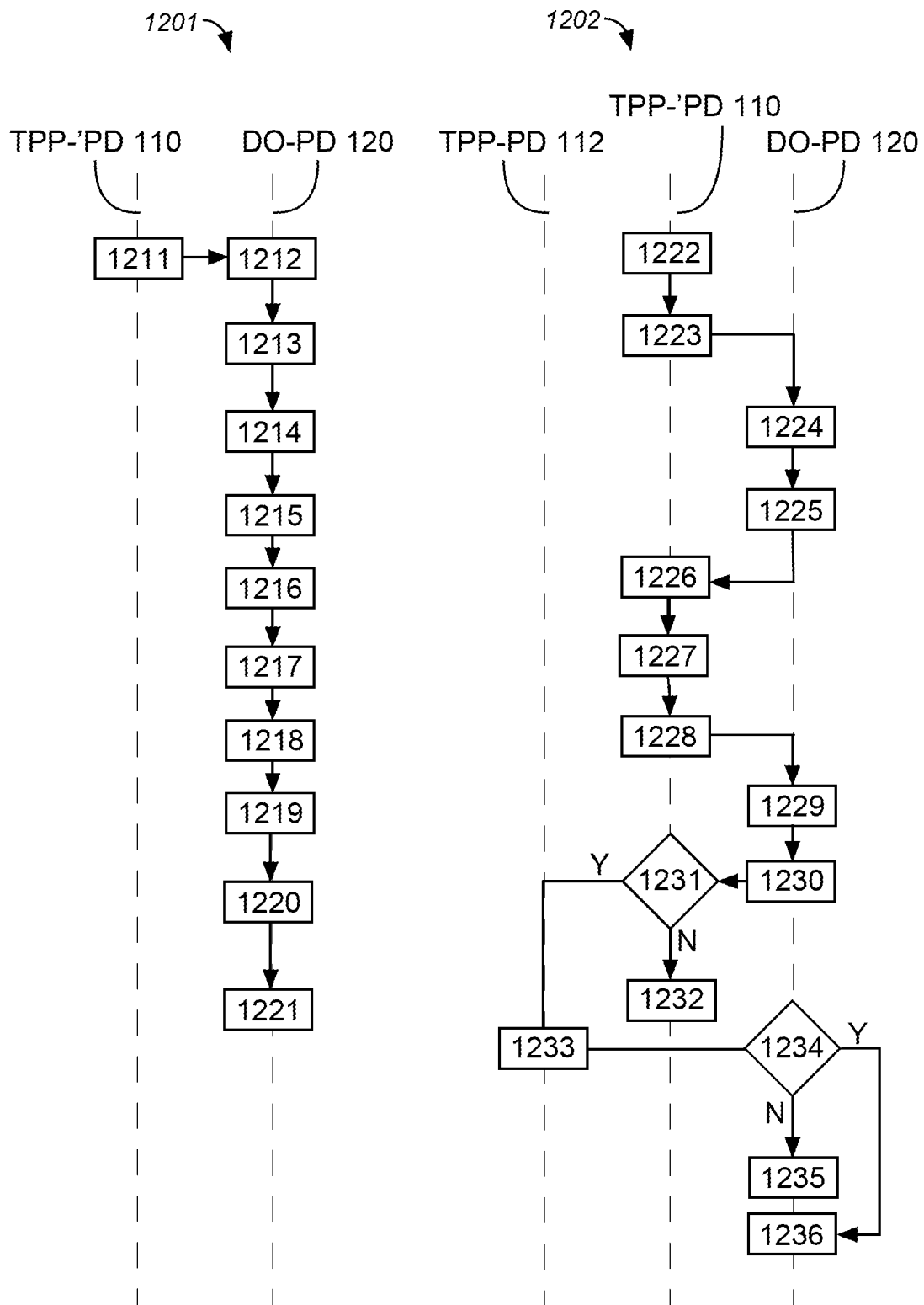
FIG. 12 is a flowchart of a ninth embodiment exclusive self-escrow method.

A ninth embodiment exclusive self-escrow method is shown in FIG. 12 as a flowchart 1201 and a flowchart 1202, where flowchart 1201 includes steps for locking DO-PD 120 in blocks 1211-1221, and where flowchart 1202 includes steps for then unlocking the DO-PD locked according to the steps of flowchart 1201 in blocks 1222-1236. The ninth embodiment exclusive self-escrow method is generally similar to the previous embodiment exclusive self-escrow methods, except as explicitly stated.

DO-PD 120 may be locked according to the steps of flowchart 1201, as per blocks 122, 123, and 124, as follows:

In block 1211, TPP-PD, using P, creates a symmetric TPP key pair as a symmetric TPP public key and a symmetric TPP private key, and provides the symmetric TPP public key to DO-PD 120.

In block 1212, after DO 20 engages with DO-PD 120, the DO-PD 120, using P, creates a symmetric PD key pair as a symmetric PD private key and a symmetric PD public key.

In block 1213, DO-PD 120, using P, calculates a SSK #1 using the symmetric TPP public key and the symmetric PD private key.

In block 1214, DO-PD 120, using P, creates a random number, RND #1.

In block 1215, DO-PD 120, using P, encrypts the RND #1 into a message #1 using the SSK #1.

In block 1216, DO-PD 120, using P, generates a random number and stores the random number as an escrow passcode.

In block 1217, DO-PD 120, using P, encrypts the escrow passcode into a message #2 using the SSK #1.

In block 1218, DO-PD 120, using P, copies message #2 to a message #2 copy.

In block 1219, DO-PD 120, using P, encrypts RND #1 and message #2 copy into a message #3 using the SSK #1.

In block 1220, DO-PD 120, using P, deletes the symmetric PD private key, SSK, RND #1, and escrow passcode.

In block 1221, the DO-PD 120, using P, saves message #1 and message #2 in the DO-PD 120.

After the execution of block 1221, DO-PD 120 is locked according to the ninth embodiment exclusive self-escrow method.

The DO-PD 120 locked according to the steps of flowchart 1201 may be unlocked according to the steps of flowchart 1202, as per blocks 125, 126, 127, and 128, as follows:

In block 1222, TPP-'PD 110 receives a validated unlock request, as per block 113.

In block 1223, TPP-PD 110, using P, creates a special random number, SPLRND # and releases it to DO-PD 120.

In block 1224, DO-PD 120, using P, validates the SPLRND # if it is formatted in a predetermined format, and places DO-PD 120 into escrow mode, as per block 125.

In block 1225, DO-PD 120, using P, releases the symmetric TPP public key, the symmetric PD public key, and the message #3 to TPP-PD 112.

In block 1226, TPP-'PD 110, using P, calculates a shared secret key, SSK #2 using the symmetric PD public key and the symmetric TPP private key. Note that if correct keys have been used then SSK #1 and SSK #2 are the same.

In block 1227, TPP-'PD 110, using P, decrypts message #3 using the SSK #2 to reveal RND #1 and message #2 copy.

In block 1228, TPP-'PD 110, using P, sends the SSK #2 to DO-PD 120.

In block 1229, DO-PD 120, using P, decrypts message #1 using the SSK #2 to reveal RND #2.

In block 1230, DO-PD 120, using P, sends RND #2 to TPP-'PD 110.

Block 1231 then performs a test whereby TPP-'PD 110 authenticates DO-PD 120. Specifically, TPP-'PD 110, using P, compares the resident credential RND #1 from block 1227 and challenge credential RND #2 from block 1230. If the correct keys have been used in the determining of the credentials, then at block 1231, RND #1 and RND #2 are identical. Thus, in block 1231, TPP-'PD 110, using P, compares RND #1 to RND #2. If RND #1 equals RND #2 then DO-PD 120 is authenticated to TTP-'PD 110, and the result of block 1231 is "Y," and if RND #1 does not equal RND #2 then the authentication has failed and the result of block 1231 is "N."

If the result of block 1231 is "N," then the authentication has failed and execution of the unlocking of DO-PD 120 stops at block 1232.

If the result of block 1231 is "Y," then then DO-PD 120 is authenticated to TTP-'PD 110 and the unlocking proceeds to block 1233, where TPP-PD 112, using P, sends message #2 copy to DO-PD 120.

Block 1234 then performs a test whereby DO-PD 120 authenticates TTP-'PD 110 as the authentic, true provider of DO-PD 120. Specifically, DO-PD 120, using P, compares the resident credential message #2 from block 1217 and challenge credential message #2 copy from block 1231. If the correct keys have been used in the determining of the credentials, then at block 1137, message #2 and message #2 copy are identical. Thus, in block 1137, DO-PD 120, using P, compares message #2 to message #2 copy. If message #2 equals message #2 copy then TTP-'PD 110 is the authenticated to DO-PD 120 and the result of block 1137 is "Y," and if message #2 does not equal message #2 copy then the result of block 1137 is "N."

If the result of block 1234 is "N," then a step of the authentication has failed and execution of the unlocking of DO-PD 120 stops at block 1235.

If the result of block 1234 is "Y," then TTP-'PD 110 is the authenticated to DO-PD 120, and the DO-PD unlocks at block 1236.

With DO-PD 120 unlocked the GA can now access the DO-PD, per the warrant for the device.

Tenth Embodiment

Figure 13:
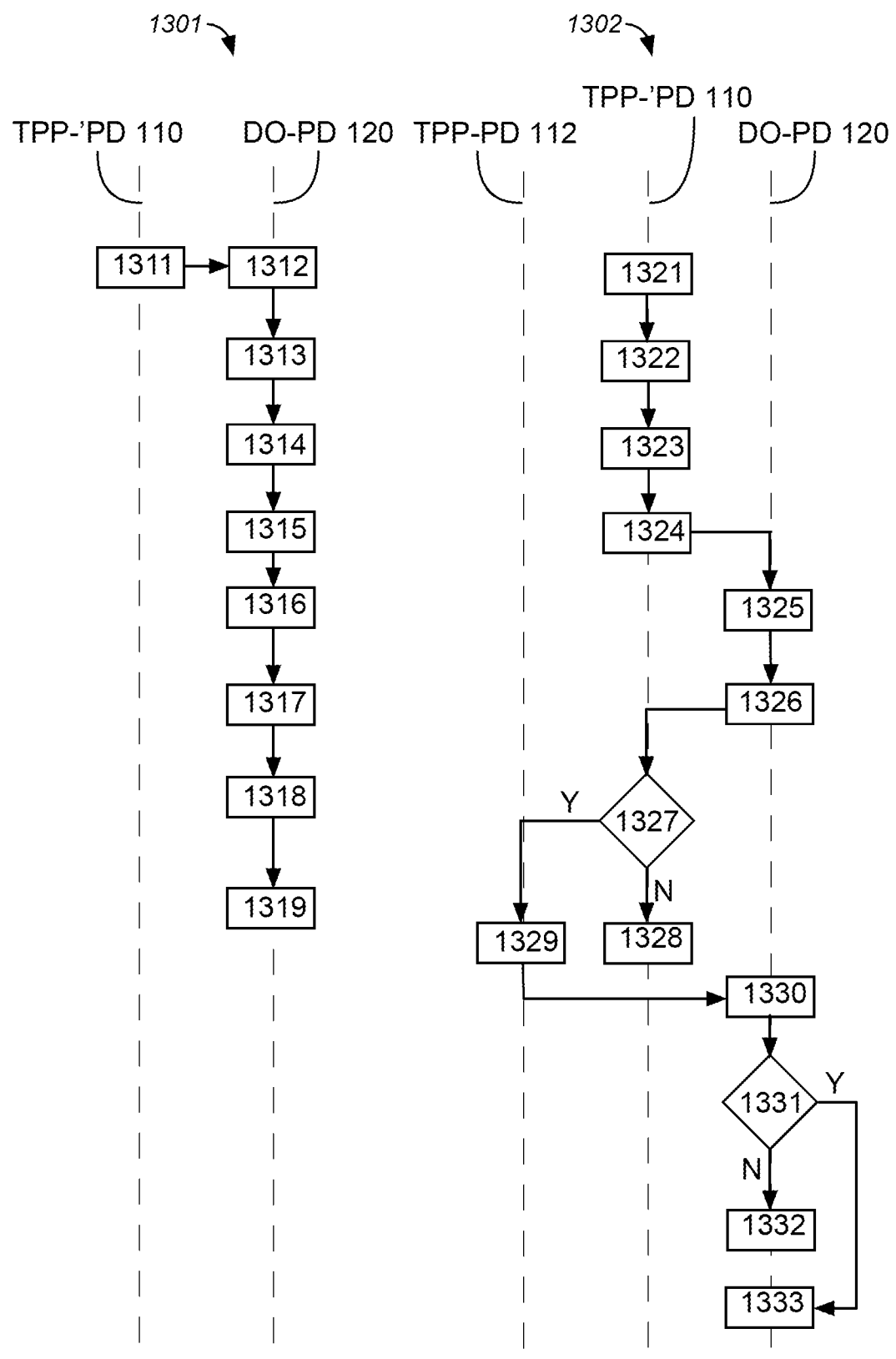
FIG. 13 is a flowchart of a tenth embodiment exclusive self-escrow method.

A tenth embodiment exclusive self-escrow method is shown in FIG. 13 as a flowchart 1301 and a flowchart 1302, where flowchart 1301 includes steps for locking DO-PD 120 in blocks 1311-1319, and where flowchart 1302 includes steps for then unlocking the DO-PD locked according to the steps of flowchart 1301 in blocks 1321-1333. The tenth embodiment exclusive self-escrow method is generally similar to the previous embodiment exclusive self-escrow methods, except as explicitly stated.

DO-PD 120 may be locked according to the steps of flowchart 1301, as per blocks 122, 123, and 124, as follows:

In block 1311, TPP-'PD 110 using P, creates a TPP key pair as a TPP private key and a TPP public key, and provides the TPP public key to DO-PD 120.

In block 1312, after DO 20 engages with DO-PD 120, the DO-PD 120, using P, creates a PD key pair #1 as a PD private key #1 and a PD public key #1, and creates a PD key pair #2 as a PD private key #2 and a PD public key #2.

In block 1313, DO-PD 120 creates a random number, RND #1.

In block 1314, DO-PD 120, using P, encrypts RND #1 into a message #1 using the PD public key #1.

In block 1315, DO-PD 120 creates a random number and stores the random number as a escrow passcode #1.

In block 1316, DO-PD 120, using P, encrypts the escrow passcode #1 into a message #2 using PD public key #2.

In block 1317, DO-PD 120, using P, encrypts RND #1, escrow passcode #1, message #2, PD private key #1, and PD private key #2 into message #3 using the TPP public key.

In block 1318, DO-PD 120, using P, deletes the PD private key #1, PD private key #2, RND #1, and escrow passcode #1.

In block 1319, the DO-PD 120, using P, saves message #1, message #2, and message #3 in DO-PD 120.

After the execution of block 1319, DO-PD 120 is locked according to the tenth embodiment exclusive self-escrow method.

The DO-PD 120 locked according to the steps of flowchart 1301 may be unlocked according to the steps of flowchart 1302, as per blocks 125, 126, 127, and 128, as follows:

In block 1321, TPP-'PD 110 receives a validated unlock request, as per block 113.

In block 1322, TPP-'PD 110, using P, places PD into escrow mode, as per block 125, and DO-PD 120 releases message #3 to TPP-PD 112.

In block 1323, TPP-'PD 110, using P, decrypts message #3 using the TPP private key to reveal RND #1, escrow passcode #1, message #2, PD private key #1, and PD private key #2.

In block 1324, TPP-'PD 110, using P, sends PD private key #1 to DO-PD 120.

In block 1325, DO-PD 120, using P, decrypts message #1 using PD private key #1 to reveal RND #1, which is stored as a as RND #2.

In block 1326, DO-PD 120, using P, sends RND #2 to TPP-'PD 110.

Block 1327 then performs a test whereby TPP-'PD 110 authenticates DO-PD 120. Specifically, TPP-'PD 110, using P, compares the resident credential RND #1 from block 1323 and challenge credential RND #2 from block 1326. If the correct keys have been used in the determining of the credentials, then at block 1231, RND #1 and RND #2 are identical. Thus, in block 1327, TPP-'PD 110, using P, compares RND #1 to RND #2. If RND #1 equals RND #2 then DO-PD 120 is authenticated to TPP-'PD 110, and the result of block 1327 is "Y," and if RND #1 does not equal RND #2 then the authentication has failed and the result of block 1327 is "N."

If the result of block 1327 is "N," then the authentication has failed and execution of the unlocking of DO-PD 120 stops at block 1328.

If the result of block 1327 is "Y," then then DO-PD 120 is authenticated to TPP-'PD 110 and the unlocking proceeds to block 1329, where TPP-PD, using P, sends PD private key #2 and escrow passcode #1 to the DO-PD 120.

In block 1330, DO-PD 120, using P, decrypts message #2 using PD private key #2 to reveal escrow passcode #1, which is renamed as escrow passcode #2.

Block 1331 then performs a test whereby DO-PD 120 authenticates TPP-'PD 110 as the authentic, true provider of DO-PD 120. Specifically, DO-PD 120, using P, compares the resident credential escrow passcode #1 from block 1329 and challenge credential escrow passcode #2 from block 1330. If the correct keys have been used in the determining of the credentials, then at block 1331, escrow passcode #1 and escrow passcode #2 are identical. Thus, in block 1331, DO-PD 120, using P, compares escrow passcode #1 to escrow passcode #2. If escrow passcode #1 equals escrow passcode #2 then TPP-'PD 110 is the authenticated to DO-PD 120 and the result of block 1331 is "Y," and if escrow passcode #1 does not equal escrow passcode #2 then the result of block 1331 is "N."

If the result of block 1331 is "N," then a step of the authentication has failed and execution of the unlocking of DO-PD 120 stops at block 1332.

If the result of block 1331 is "Y," then TPP-'PD 110 is the authenticated to DO-PD 120, and the DO-PD unlocks at block 1333.

With DO-PD 120 unlocked the GA can now access the DO-PD, per the warrant for the device.

Eleventh Embodiment

Figure 14:
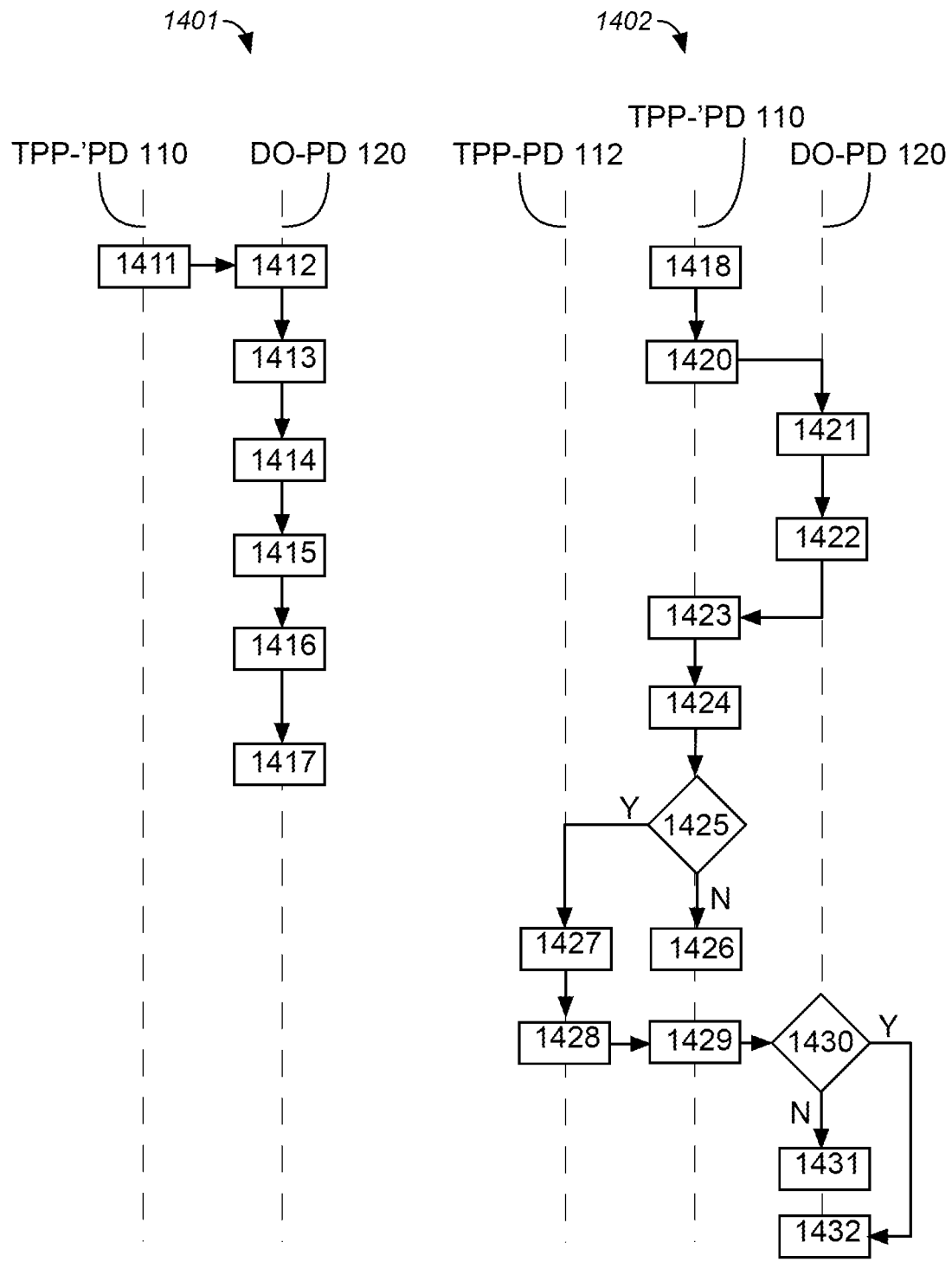
FIG. 14 is a flowchart of a eleventh embodiment exclusive self-escrow method.

A eleventh embodiment exclusive self-escrow method is shown in FIG. 14 as a flowchart 1401 and a flowchart 1402, where flowchart 1401 includes steps for locking DO-PD 120 in blocks 1411-1417, and where flowchart 1402 includes steps for then unlocking the DO-PD locked according to the steps of flowchart 1401 in blocks 1419-1432. The eleventh embodiment exclusive self-escrow method is generally similar to the previous embodiment exclusive self-escrow methods, except as explicitly stated.

DO-PD 120 may be locked according to the steps of flowchart 1401, as per blocks 122, 123, and 124, as follows:

In block 1411, TPP-PD, using P, creates a TPP key pair as a TPP private key and a TPP public key, and provides the TPP public key to DO-PD 120.

In block 1412, after DO 20 engages with DO-PD 120, the DO-PD 120, using P, creates PD key pair as a PD private key and a PD public key.

In block 1413, the DO-PD 120, using P, creates a random number as an escrow passcode #1.

In block 1414, the DO-PD 120, using P, encrypts the escrow passcode #1 into a message #1 using PD public key.

In block 1415, the DO-PD 120, using P, encrypts escrow passcode #1 and PD private key into a message #2 using the TPP public key.

In block 1416, the DO-PD 120 deletes the PD key pair and escrow passcode #1.

In block 1417, the DO-PD 120 saves message #1 and message #2 in the DO-PD 120.

After the execution of block 1417, DO-PD 120 is locked according to the eleventh embodiment exclusive self-escrow method.

The DO-PD 120 locked according to the steps of flowchart 1401 may be unlocked according to the steps of flowchart 1402, as per blocks 125, 126, 127, and 128, as follows:

In block 1419, TPP-'PD 110 receives a validated unlock request, as per block 113.

In block 1420, TPP-'PD 110, using P, TPP 10 creates a special random number, SPLRND #1, which is submitted to DO-PD 120.

In block 1421, the DO-PD 120 validates SPLRND #1 if it is formatted in a predetermined format, and places DO-PD 120 into escrow mode, as per block 125.

In block 1422, the DO-PD 120 encrypts SPLRND #1 and message #2 into a message #3 using the TPP public key.

In block 1423, TPP-'PD 110 receives message #3 from DO-PD 120.

In block 1424, TPP-'PD 110 decrypts message #3 using TPP private key to reveal SPLRND #1, which is renamed SPLRND #2, and message #2.

Block 1425 then performs a test whereby TPP-'PD 110 authenticates DO-PD 120. Specifically, TPP-'PD 110, using P, compares the resident credential SPLRND #1 from block 1420 and challenge credential SPLRND #2 from block 1424. If the correct keys have been used in the determining of the credentials, then at block 1425, SPLRND #1 and SPLRND #2 are identical. Thus, in block 1425, TPP-'PD 110, using P, compares SPLRND #1 to SPLRND #2. If SPLRND #1 equals SPLRND #2 then DO-PD 120 is authenticated to TPP-'PD 110, and the result of block 1425 is "Y," and if SPLRND #1 does not equal SPLRND #2 then the authentication has failed and the result of block 1425 is "N."

If the result of block 1425 is "N," then the authentication has failed and execution of the unlocking of DO-PD 120 stops at block 1426.

If the result of block 1425 is "Y," then then DO-PD 120 is authenticated to TPP-'PD 110 and the unlocking proceeds to block 1427, where TPP-PD 112 decrypts message #2 to reveal escrow passcode #1 and PD private key.

In block 1428, TPP-PD 112 sends PD private key and escrow passcode #1 to DO-PD 120.

In block 1429, DO-PD 120 decrypts message #1 using PD private key to reveal escrow passcode #1, which is renamed escrow passcode #2.

Block 1430 then performs a test whereby DO-PD 120 authenticates TTP-'PD 110 as the authentic, true provider of DO-PD 120. Specifically, DO-PD 120, using P, compares the resident credential escrow passcode #1 from block 1428 and challenge credential escrow passcode #2 from block 1429. If the correct keys have been used in the determining of the credentials, then at block 1331, escrow passcode #1 and escrow passcode #2. Thus, in block 1430, DO-PD 120, using P, compares escrow passcode #1 to escrow passcode #2. If escrow passcode #1 equals escrow passcode #2 then TTP-'PD 110 is the authenticated to DO-PD 120 and the result of block 1430 is "Y," and if escrow passcode #1 does not equal escrow passcode #2 then the result of block 1430 is "N."

If the result of block 1430 is "N," then a step of the authentication has failed and execution of the unlocking of DO-PD 120 stops at block 1431.

If the result of block 1430 is "Y," then TTP-'PD 110 is the authenticated to DO-PD 120, and the DO-PD unlocks at block 1432.

With DO-PD 120 unlocked the GA can now access the DO-PD, per the warrant for the device.

Twelfth Embodiment

Figure 15:
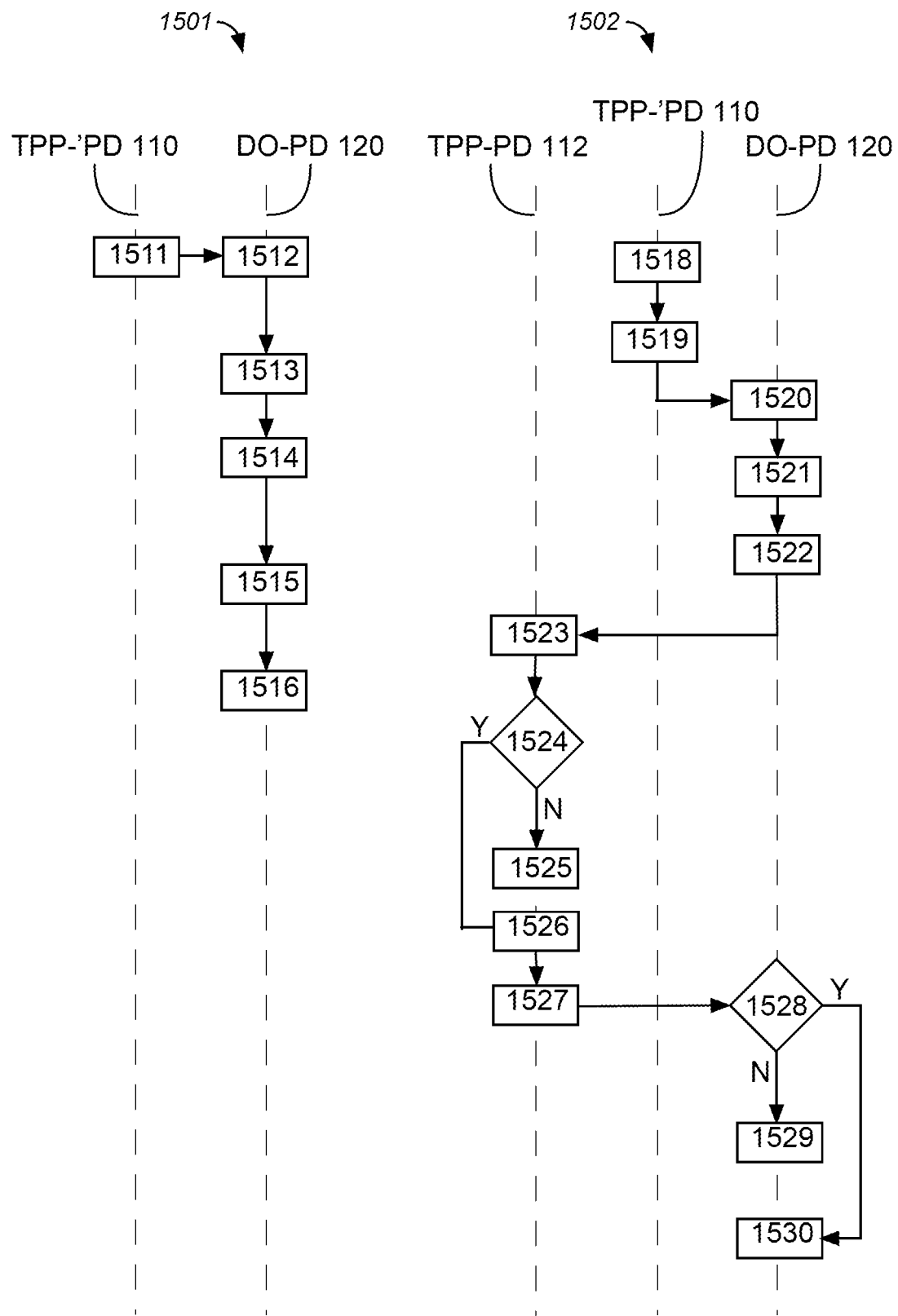
FIG. 15 is a flowchart of a twelfth embodiment exclusive self-escrow method.

A twelfth embodiment exclusive self-escrow method is shown in FIG. 15 as a flowchart 1501 and a flowchart 1502, where flowchart 1501 includes steps for locking DO-PD 120 in blocks 1511-1516, and where flowchart 1502 includes steps for then unlocking the DO-PD locked according to the steps of flowchart 1501 in blocks 1518-1530. The thirteenth embodiment exclusive self-escrow method is generally similar to the previous embodiment exclusive self-escrow methods, except as explicitly stated.

DO-PD 120 may be locked according to the steps of flowchart 1501, as per blocks 122, 123, and 124, as follows:

In block 1511, TPP-PD, using P, creates a TPP key pair as a TPP private key and a TPP public key, and provides the TPP public key to DO-PD 120.

In block 1512, after DO 20 engages with DO-PD 120, the DO-PD 120, using P, creates a random number which is stored as an Escrow Passcode.

In block 1513, the DO-PD 120, using P, hashes the Escrow Passcode into a EPasscodeHash #1.

In block 1514, the DO-PD 120, using P, encrypts EPasscodeHash #1 into a message #1 using the TPP public key.

In block 1515, the DO-PD 120, using P, saves EPasscodeHash #1 and message #1 in the DO-PD 120.

In block 1516, the DO-PD 120, using P, deletes the Escrow Passcode.

After the execution of block 1516, DO-PD 120 is locked according to the twelfth embodiment exclusive self-escrow method.

The DO-PD 120 locked according to the steps of flowchart 1501 may be unlocked according to the steps of flowchart 1502, as per blocks 125, 126, 127, and 128, as follows:

In block 1518, TPP-'PD 110 receives a validated unlock request, as per block 113.

In block 1519, TPP-'PD 110, using P, creates a special random number, SPLRND #1, and releases it to DO-PD 120.

In block 1520, DO-PD 120, using P, validates SPLRND #1 if it one of a predetermined pool of random numbers, and places DO-PD 120 into escrow mode, as per block 125.

In block 1521, DO-PD 120, using P, encrypts SPLRND #1 and message #1 into a message #2 using the TPP public key.

In block 1522, DO-PD 120, using P, releases TPP public key and message #2 to TPP-PD 112.

In block 1523, TPP-PD 112, using P, decrypts message #2 using TPP private key to reveal SPLRND #1, which is renamed as SPLRND #2, and message #1.

Block 1524 then performs a test whereby, TPP-PD 112 authenticates DO-PD 120. Specifically, TPP-PD 112, using P, compares the resident credential SPLRND #1 from block 1519 and challenge credential SPLRND #2 from block 1523. If the correct keys have been used in the determining of the credentials, then at block 1524, SPLRND #1 and SPLRND #2 are identical. Thus, in block 1524, TPP-'PD 110, using P, compares SPLRND #1 to SPLRND #2. If SPLRND #1 equals SPLRND #2 then DO-PD 120 is authenticated to TPP-'PD 110, and the result of block 1524 is "Y," and if SPLRND #1 does not equal SPLRND #2 then the authentication has failed and the result of block 1524 is "N."

If the result of block 1524 is "N," then the authentication has failed and execution of the unlocking of DO-PD 120 stops at block 1525.

If the result of block 1524 is "Y," then then DO-PD 120 is authenticated to TPP-'PD 110 and the unlocking proceeds to block 1526, where TPP-PD 112, using P, decrypts message #1 using the TPP private key to reveal EPasscodeHash #1, which is renamed as EPasscodeHash #2.

In block 1527, TPP-PD 112, using P, sends EPasscodeHash #2 to the DO-PD 120.

Block 1528 then performs a test whereby DO-PD 120 authenticates TPP-'PD 110 as the authentic, true provider of DO-PD 120. Specifically, DO-PD 120, using P, compares the resident credential EPasscodeHash #1 from block 1515 and challenge credential EPasscodeHash #2 from block 1527. If the correct keys have been used in the determining of the credentials, then at block 1528, EPasscodeHash #1 equals EPasscodeHash #2. Thus, in block 1528, DO-PD 120, using P, compares EPasscodeHash #1 to EPasscodeHash #2. If EPasscodeHash #1 equals EPasscodeHash #2 then TPP-'PD 110 is the authenticated to DO-PD 120 and the result of block 1528 is "Y," and if EPasscodeHash #1 does not equal EPasscodeHash #2 then the result of block 1528 is "N."

If the result of block 1528 is "N," then a step of the authentication has failed and execution of the unlocking of DO-PD 120 stops at block 1529.

If the result of block 1528 is "Y," then TPP-'PD 110 is the authenticated to DO-PD 120, and the DO-PD unlocks at block 1530.

With DO-PD 120 unlocked the GA can now access the DO-PD, per the warrant for the device.

Thirteenth Embodiment

Figure 16:
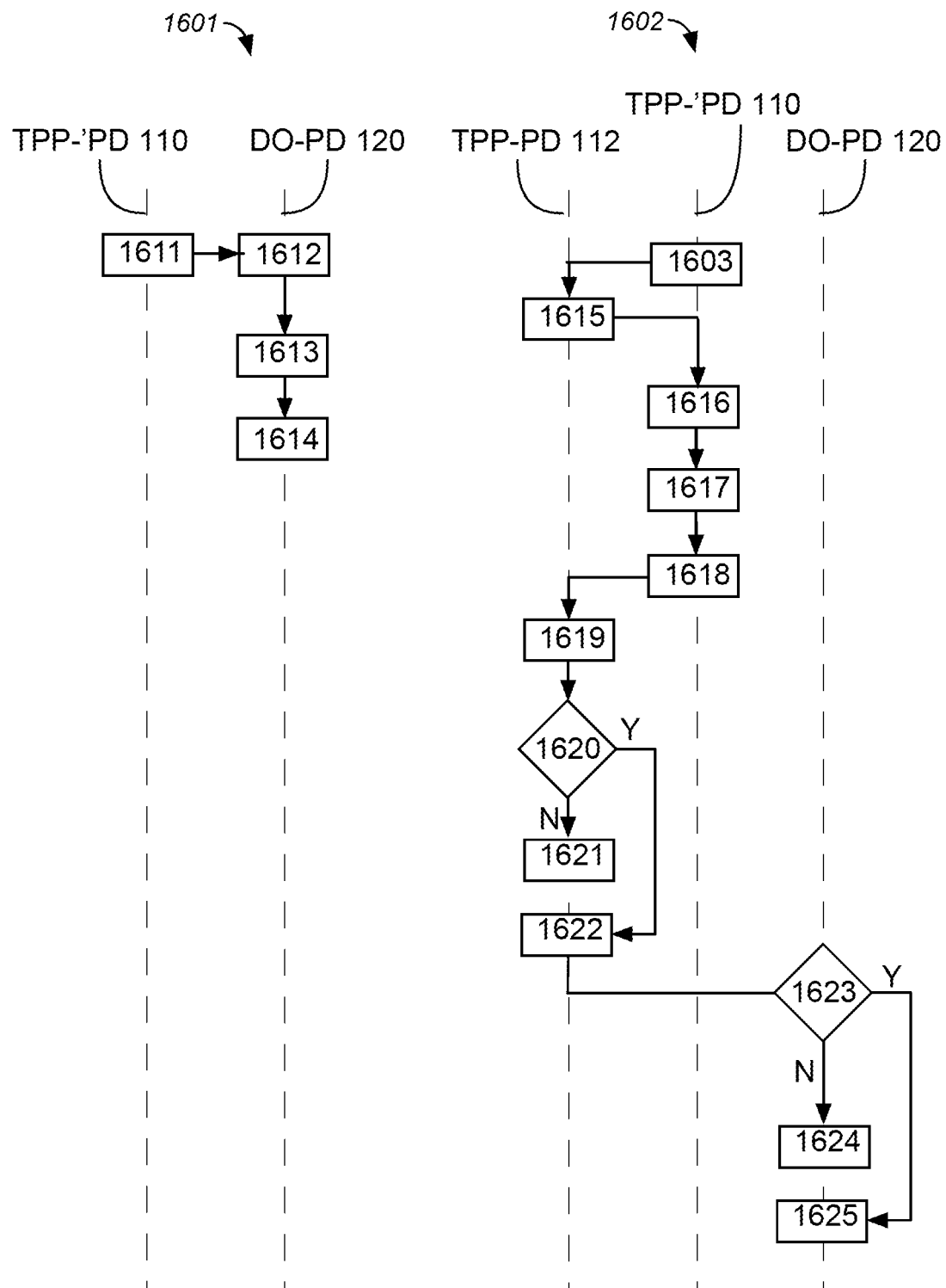
FIG. 16 is a flowchart of a thirteenth embodiment exclusive self-escrow method.

A thirteenth embodiment exclusive self-escrow method is shown in FIG. 16 as a flowchart 1601 and a flowchart 1602, where flowchart 1601 includes steps for locking DO-PD 120 in blocks 1611-1614, and where flowchart 1602 includes steps for then unlocking the DO-PD locked according to the steps of flowchart 1601 in blocks 1603 and 1615-1625. The thirteenth embodiment exclusive self-escrow method is generally similar to the previous embodiment exclusive self-escrow methods, except as explicitly stated.

DO-PD 120 may be locked according to the steps of flowchart 1601, as per blocks 122, 123, and 124, as follows:

In block 1611, TPP-'PD 110, using P, creates a TPP key pair as TPP private key and a TPP public key, and provides the TPP Public Key to DO-PD 120.

In block 1612, after DO 20 engages with DO-PD 120, the DO-PD 120, using P, creates a random number which is stored as an Escrow Passcode.

In block 1613, the DO-PD 120, using P, encrypts the Escrow Passcode into a message #1 using the TPP public key.

In block 1614, the DO-PD 120, using P, deletes the Escrow passcode.

After the execution of block 1614, DO-PD 120 is locked according to the thirteenth embodiment exclusive self-escrow method.

The DO-PD 120 locked according to the steps of flowchart 1601 may be unlocked according to the steps of flowchart 1602, as per blocks 125, 126, 127, and 128, as follows:

In block 1603, TPP-'PD 110 receives a validated unlock request, as per block 113.

In block 1615, TPP-'PD 110, using P, creates a random number, RND #1 from a subset of random numbers, and releases RND #1 to DO-PD 120.

In block 1616, the DO-PD 120, using P, validates RND #1 as being a member of the subset, placing PD into escrow mode, as per block 125.

In block 1617, the DO-PD 120, using P, encrypts RND #1 and message #1 into a message #2 using the TPP public key.

In block 1618, the DO-PD 120, using P, releases TPP public key and message #2 to TPP-PD 112.

In block 1619, TPP-PD 112, using P, decrypts message #2 using the TPP private key to reveal the RND #1, which is renamed to RND #2, and message #1, which is renamed to message #4.

Block 1620 then performs a test whereby TPP-'PD 110 authenticates DO-PD 120. Specifically, TPP-'PD 110, using P, compares the resident credential RND #1 from block 1615 and challenge credential RND #2 from block 1619. If the correct keys have been used in the determining of the credentials, then at block 1620, RND #1 and RND #2 are identical. Thus, in block 1620, TPP-'PD 110, using P, compares RND #1 to RND #2. If RND #1 equals RND #2 then DO-PD 120 is authenticated to TTP-'PD 110, and the result of block 1620 is "Y," and if RND #1 does not equal RND #2 then the authentication has failed and the result of block 1620 is "N."

If the result of block 1621 is "N," then the authentication has failed and execution of the unlocking of DO-PD 120 stops at block 1525.

If the result of block 1622 is "Y," then then DO-PD 120 is authenticated to TTP-'PD 110 and the unlocking proceeds to block 1526, where TPP-PD 112, using P, sends message #4 to DO-PD 120.

Block 1623 then performs a test whereby DO-PD 120 authenticates TTP-'PD 110 as the authentic, true provider of DO-PD 120. Specifically, DO-PD 120, using P, compares the resident credential message #1 from block 1613 and challenge credential message #4 from block 1622. If the correct keys have been used in the determining of the credentials, then at block 1623, message #1 equals message #4. Thus, in block 1623, DO-PD 120, using P, compares message #1 to message #4. If message #1 equals message #4 then TTP-'PD 110 is the authenticated to DO-PD 120 and the result of block 1623 is "Y," and if message #1 does not equal message #4 then the result of block 1623 is "N."

If the result of block 1623 is "N," then a step of the authentication has failed and execution of the unlocking of DO-PD 120 stops at block 1624.

If the result of block 1623 is "Y," then TTP-'PD 110 is the authenticated to DO-PD 120, and the DO-PD unlocks at block 1625.

With DO-PD 120 unlocked the GA can now access the DO-PD, per the warrant for the device.

Fourteenth Embodiment

Figure 17:
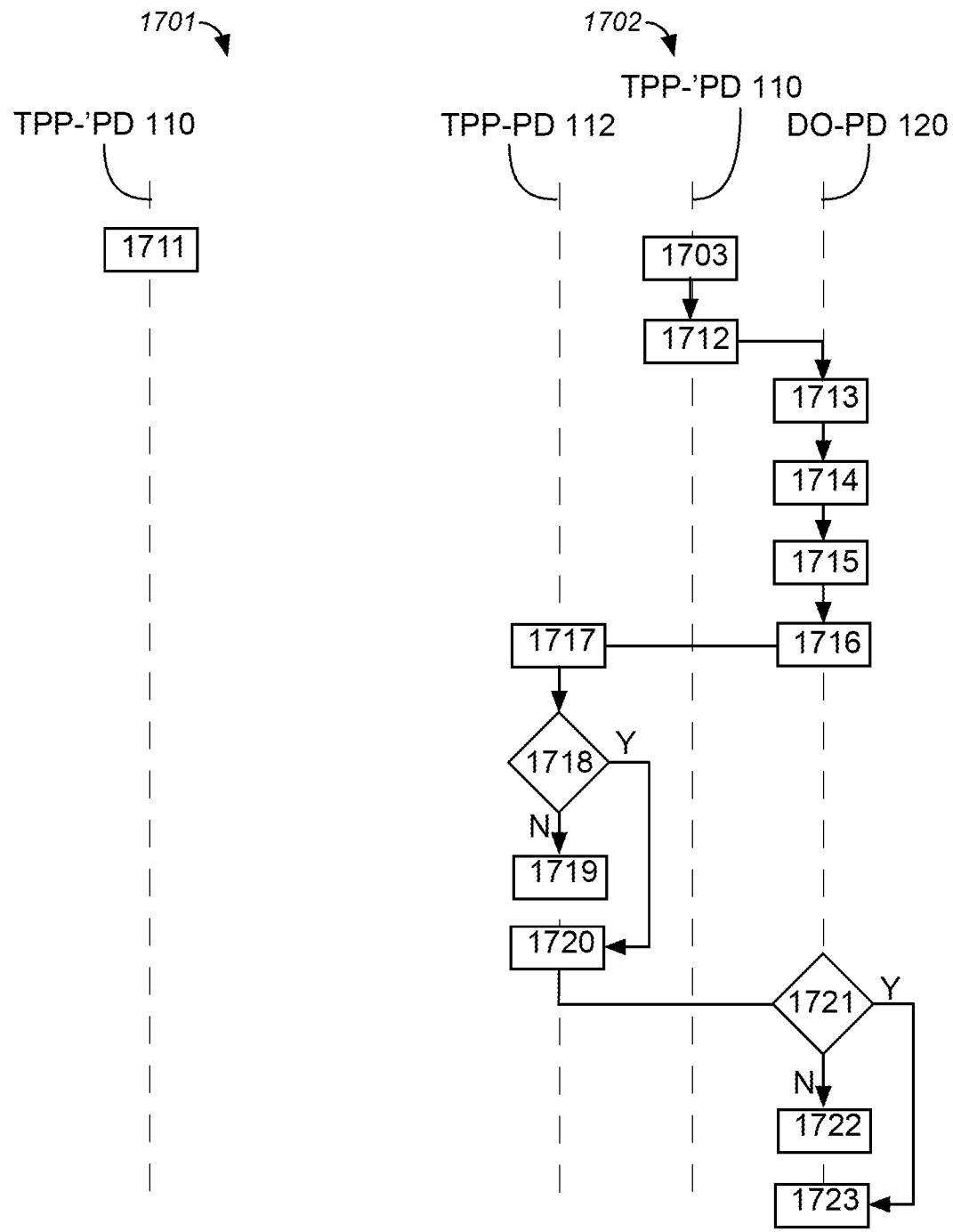
FIG. 17 is a flowchart of a fourteenth embodiment exclusive self-escrow method.

A fourteenth embodiment exclusive self-escrow method is shown in FIG. 17 as a flowchart 1701 and a flowchart 1702, where flowchart 1701 includes steps for locking DO-PD 120 in blocks 1711, and where flowchart 1702 includes steps for then unlocking the DO-PD locked according to the steps of flowchart 1701 in blocks 1703 and 1712-1723. The fourteenth embodiment exclusive self-escrow method is generally similar to the previous embodiment exclusive self-escrow methods, except as explicitly stated.

DO-PD 120 may be locked according to the steps of flowchart 1701, as per blocks 122 and 124, as follows:

In block 1711, TPP-'PD 110, using P, creates a TPP key pair as TPP private key and a TPP public key, and provides the TPP Public Key to DO-PD 120.

In block 1712, after DO 20 engages with DO-PD 120, the DO-PD 120, using P, saves TPP public key.

After the execution of block 1712, DO-PD 120 is locked according to the seventh embodiment exclusive self-escrow method. This embodiment differs from embodiments 1 through 13, in that credentials are generated during the unlocking of DO-PD 120.

The DO-PD 120 locked according to the steps of flowchart 1701 may be unlocked according to the steps of flowchart 1002, as per blocks 125, 126, 127, and 128, as follows:

In block 1713, TPP-'PD 110 receives a validated unlock request, as per block 113.

In block 1714, TPP-'PD 110, using P, creates a random number, RND #1 from a small subset of random numbers and releases it to DO-PD 120.

In block 1715, after DO 20 engages with DO-PD 120 as per block 122, the DO-PD 120, using P, validates RND #1, placing PD into escrow mode, as per block 125.

In block 1716, the DO-PD 120, using P, creates a random number, RND #2.

In block 1717, the DO-PD 120, using P, encrypts RND #1 and RND #2 into a message #1, using the TPP public key.

In block 1718, the DO-PD 120, using P, releases message #1 to TPP-PD 112.

In block 1719, TPP-PD 112 decrypts message #1 using the TPP private key to reveal RND #1 and RND #2, renamed as RND #3, and RND #4.

Block 1720 then performs a test whereby TPP-'PD 110 authenticates DO-PD 120. Specifically, TPP-PD 112, using P, compares the resident credential RND #1 from block 1712 and challenge credential RND #3 from block 1717. If the correct keys have been used in the determining of the credentials, then at block 1718, RND #1 and RND #3 are identical. Thus, in block 1720, TPP-'PD 110, using P, compares RND #1 to RND #3. If RND #1 equals RND #3 then DO-PD 120 is authenticated to TPP-'PD 110, and the result of block 1720 is "Y," and if RND #1 does not equal RND #3 then the authentication has failed and the result of block 1720 is "N."

If the result of block 1720 is "N," then the authentication has failed and execution of the unlocking of DO-PD 120 stops at block 1721.

If the result of block 1720 is "Y," then then DO-PD 120 is authenticated to TPP-'PD 110 and the unlocking of DO-PD 120 proceeds to block 1722, where TPP-PD 112, using P, sends RND #4 to the DO-PD 120.

Block 1723 then performs a test whereby DO-PD 120 authenticates TPP-'PD 110 as the authentic, true provider of DO-PD 120. Specifically, DO-PD 120, using P, compares the resident credential RND #2 from block 1714 and challenge credential RND #4 from block 1718. If the correct keys have been used in the determining of the credentials, then at block 1723, RND #2 equals RND #4. Thus, in block 1723, DO-PD 120, using P, compares RND #2 to RND #4. If RND #2 equals RND #4 then TPP-'PD 110 is the authenticated to DO-PD 120 and the result of block 1723 is "Y," and if RND #2 does not equal RND #4 then the result of block 1721 is "N."

If the result of block 1723 is "N," then a step of the authentication has failed and execution of the unlocking of DO-PD 120 stops at block 1724.

If the result of block 1723 is "Y," then TPP-'PD 110 is the authenticated to DO-PD 120, and the DO-PD unlocks at block 1725.

With DO-PD 120 unlocked the GA can now access the DO-PD, per the warrant for the device.

One embodiment of each of the methods described herein is in the form of a computer program that executes on a processing system. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added, deleted, or combined from the block diagrams and operations may be interchanged among functional blocks. Steps may be added or deleted to methods described within the scope of the present invention.

The invention claimed is:

1. A method for a third party (TP) having a TP domain to unlock a locked device owner's program domain (DO-PD), said method comprising:
   a first authenticating of the DO-PD by the TP domain, where the TP domain has an associated TP key pair including a TP public key and a TP private key and where the DO-PD has an associated PD key pair including a PD public key and a PD private key, where the TP domain has a first credential that is a TP domain resident credential that is stored or computed within the TP domain, where the first authenticating of the DO-PD by the TP domain includes
      the TP domain using the DO-PD public key to encrypt the TP domain resident credential,
      the TP domain sending the encrypted TP domain resident credential to the DO-PD,
      the DO-PD using the DO-PD private key to decrypt the encrypted TP domain resident credential,
      the DO-PD encrypting the TP domain resident credential with a TP domain public key to form a second credential, where the second credential is a TP domain challenge credential,
      the DO-PD sending the encrypted TP domain challenge credential to the TP domain,
      the TP domain using a TP domain private key to reveal the TP domain challenge credential, and
      comparing the TP domain resident credential to the revealed TP domain challenge credential, where the first authenticating is successful if the TP domain resident credential is equal to the revealed domain challenge credential;
   a second authenticating of the TP domain by the DO-PD, where the DO-PD has a third credential that is a DO-PD resident credential that is stored or computed within the DO-PD, where the second authenticating of the TP domain by the DO-PD includes
      the DO-PD using a TP domain public key to encrypt the DO-PD resident credential,
      the DO-PD sending the encrypted DO-PD domain resident credential to the TP domain,
      the TP domain using a TP domain private key to decrypt the encrypted DO-PD resident credential,
      the TP domain encrypting the DO-PD resident credential with a DO-PD public key to form a fourth credential, where the fourth credential is a DO-PD challenge credential,
      the TP domain sending the encrypted DO-PD challenge credential to the DO-PD,
      the DO-PD using a DO-PD private key to reveal the DO-PD challenge credential, and
      comparing the DO-PD resident credential to the revealed DO-PD challenge credential, where the second authenticating is successful if the DO-PD resident credential is equal to the revealed DO-PD challenge credential; and
   unlocking the locked DO-PD after the successful first authenticating and the successful second authenticating.

2. The method of claim 1, where at least one credential of the first credential, the second credential, the third credential, or the fourth credential is a passcode, a random number, a device ID of the electronic device credential, a shared secret key of the PD and the TP domain, an encrypted passcode, an encrypted random number, an encrypted device ID of the electronic device credential, an encrypted shared secret key of the PD and the TP domain, a passcode, a random number, a device ID of the electronic device credential, a shared secret key of the PD and the TP domain, a hashed passcode, a hashed random number, a hashed device ID of the electronic device credential, or a hashed shared secret key of the PD and the TP domain.

3. The method of claim 1, where at least one credential of the first credential, the second credential, the third credential, or the fourth credential is revealed or generated using at least one key of the TP key pair.

4. The method of claim 1, where at least one credential of the first credential, the second credential, the third credential, or the fourth credential is revealed or generated using at least one key of the PD key pair.

5. The method of claim 1, where the DO-PD and the TP domain have a shared secret key, and where at least one credential of the first credential, the second credential, the third credential, or the fourth credential is revealed or generated using the shared secret key.

6. The method of claim 1, where at least one of the messages includes keys used in generating or revealing a credential.

7. The method of claim 1, where the TP domain includes is a first subdomain contained within the DO-PD (TP-PD) and subdomain which is not within the DO-PD (TP-'PD).

8. The method of claim 1, where said DO-PD is a horizonal program domain.

9. The method of claim 1, where said DO-PD is within an electronic device.

10. The method of claim 9, where electronic device is a smartphone or a computer or a tablet.

11. The method of claim 1, where said DO-PD is a vertical program domain.

12. The method of claim 1, where said DO-PD contains a database, a word processor, a spreadsheet, a bitcoin wallet, or a mobile lockbox.

13. The method of claim 1, where the TP is a first TP having a first TP domain, where the method further includes a second TP having a second TP domain, where the method further includes
   a third authenticating of the second TP domain by the DO-PD, where the third authenticating is successful when a fifth credential is equal to a sixth credential, and where at least one credential of the fifth credential or the sixth credential is generated, revealed, or stored in the DO-PD; and
   where the unlocking the locked DO-PD unlocks only after the successful third authenticating.

14. The method of claim 1, where the first authenticating of the DO-PD by the TP domain and the second authenticating of the TP domain by the DO-PD are mutual authentication using exclusive self-escrow.

15. The method of claim 1, the method includes providing a TP subdomain in DO-PD (TP-PD) as a workspace accessed during the first authenticating or the second authenticating.

16. An apparatus for a third party (TP) having a TP domain to unlock a locked device owner's program domain (DO-PD), where the DO-PD has a memory and a processor, programmed to perform the steps of:
  a first authenticating of the DO-PD by the TP domain, where the TP domain has an associated TP key pair including a TP public key and a TP private key and where the DO-PD has an associated PD key pair including a PD public key and a PD private key, where the TP domain has a first credential that is a TP domain resident credential that is stored or computed within the TP domain, where the first authenticating of the DO-PD by the TP domain includes
    the TP domain using the DO-PD public key to encrypt the TP domain resident credential,
    the TP domain sending the encrypted TP domain resident credential to the DO-PD,
    the DO-PD using the DO-PD private key to decrypt the encrypted TP domain resident credential,
    the DO-PD encrypting the TP domain resident credential with a TP domain public key to form a second credential, where the second credential is a TP domain challenge credential,
    the DO-PD sending the encrypted TP domain challenge credential to the TP domain,
    the TP domain using a TP domain private key to reveal the TP domain challenge credential, and
  comparing the TP domain resident credential to the revealed TP domain challenge credential, where the first authenticating is successful if the TP domain resident credential is equal to the revealed domain challenge credential;
  a second authenticating of the TP domain by the DO-PD, where the DO-PD has a third credential that is a DO-PD resident credential that is sored or computed within the DO-PD, where the second authenticating of the TP domain by the DO-PD includes
    the DO-PD using a TP domain public key to encrypt the DO-PD resident credential,
    the DO-PD sending the encrypted DO-PD domain resident credential to the TP domain,
    the TP domain using a TP domain private key to decrypt the encrypted DO-PD resident credential,
    the TP domain encrypting the DO-PD resident credential with a DO-PD public key to form a fourth credential, where the fourth credential is a DO-PD challenge credential,
    the TP domain sending the encrypted DO-PD challenge credential to the DO-PD,
    the DO-PD using a DO-PD private key to reveal the DO-PD challenge credential, and
  comparing the DO-PD resident credential to the revealed DO-PD challenge credential, where the second authenticating is successful if the DO-PD resident credential is equal to the revealed DO-PD challenge credential; and
  unlocking the locked DO-PD after the successful first authenticating and the successful second authenticating.

17. The apparatus of claim 16, where at least one credential of the first credential, the second credential, the third credential, or the fourth credential is a passcode, a random number, a device ID of the electronic device credential, a shared secret key of the PD and the TP domain, an encrypted passcode, an encrypted random number, an encrypted device ID of the electronic device credential, an encrypted shared secret key of the PD and the TP domain, a passcode, a random number, a device ID of the electronic device credential, a shared secret key of the PD and the TP domain, a hashed passcode, a hashed random number, a hashed device ID of the electronic device credential, or a hashed shared secret key of the PD and the TP domain.

18. The apparatus of claim 16, where at least one credential of the first credential, the second credential, the third credential, or the fourth credential is revealed or generated using at least one key of the TP key pair.

19. The apparatus of claim 16, where at least one credential of the first credential, the second credential, the third credential, or the fourth credential is revealed or generated using at least one key of the PD key pair.

20. The apparatus of claim 16, where the DO-PD and the TP domain have a shared secret key, and where at least one credential of the first credential, the second credential, the third credential, or the fourth credential is revealed or generated using the shared secret key.

21. The apparatus of claim 16, where at least one of the messages includes keys used in generating or revealing a credential.

22. The apparatus of claim 16, where the TP domain includes is a first subdomain contained within the DO-PD (TP-PD) and subdomain which is not within the DO-PD (TP-PD).

23. The apparatus of claim 16, where said DO-PD is a horizonal program domain.

24. The apparatus of claim 16, where said DO-PD is within an electronic device.

25. The apparatus of claim 24, where electronic device is a smartphone or a computer or a tablet.

26. The apparatus of claim 16, where said DO-PD is a vertical program domain.

27. The apparatus of claim 16, where said DO-PD contains a database, a word processor, a spreadsheet, a bitcoin wallet, or a mobile lockbox.

28. The apparatus of claim 16, where the TP is a first TP having a first TP domain, where the method further includes a second TP having a second TP domain, where the method further includes
  a third authenticating of the second TP domain by the DO-PD, where the third authenticating is successful when a fifth credential is equal to a sixth credential, and where at least one credential of the fifth credential or the sixth credential is generated, revealed, or stored in the DO-PD; and
  where the unlocking the locked DO-PD unlocks only after the successful third authenticating.

29. The apparatus of claim 16, where the DO-PD is programmed to perform the steps of the first authenticating of the DO-PD by the TP domain and the second authenticating of the TP domain by the DO-PD by mutual authentication using exclusive self-escrow.

30. The apparatus of claim 16, where the DO-PD is programmed to perform the step of providing a TP subdomain in DO-PD (TP-PD) as a workspace accessed during the first authenticating or the second authenticating.

* * * * *

UNITED STATES PATENT AND TRADEMARK OFFICE
CERTIFICATE OF CORRECTION

PATENT NO. : 11,509,649 B2
APPLICATION NO. : 17/490026
DATED : November 22, 2022
INVENTOR(S) : James C. Collier and Michael Pompa It is certified that error appears in the above-identified patent and that said Letters Patent is hereby corrected as shown below:

In the Claims

In Claim 1: Column 45 Line 30 replace "DO-PD public key" with -- PD public key --; Line 34 replace "DO-PD private key" with -- PD private key --; Line 37 replace "a TP domain public key" with -- the TP public key --; Line 42 replace "a TP domain private key" with -- the TP private key --; Line 54 replace "a TP domain public key" with -- the TP public key --; Line 58 replace "a TP domain private key" with -- the TP private key --; Line 61 replace "a DO-DP public key" with -- the PD public key --; and Line 66 replace "a DO-PD private key" with -- the PD private key --.

In Claim 2: Column 46 Line 12 replace "the electronic" with -- an electronic --; Lines 13, 16, and 21 replace "the PD" with -- the DO-PD --; Lines 16-18 delete the text "a passcode, a random number, a device ID of the electronic device credential, a shared secret key of the PD and the TP domain,".

In Claim 10: Column 46 Line 45 replace "where electronic device" with -- where the electronic device --.

In Claim 15: Column 47 Line 2 replace "in DO-PD" with -- in the DO-PD --.

In Claim 16: Column 47 Line 18 replace "DO-PD public key" with -- PD public key --; Line 22 replace "DO-PD private key" with -- PD private key --; Line 25 replace "a TP domain public key" with -- the TP public key --; Line 30 replace "a TP domain private key" with -- the TP private key --; Line 42 replace "a TP domain public key" with -- the TP public key --; Line 46 replace "a TP domain private key" with -- the TP private key --; Line 49 replace "a DO-DP public key" with -- the PD public key --; and Line 54 replace "a DO-PD private key" with -- the PD private key --.

In Claim 17: Column 48 Line 1 replace "the electronic" with -- an electronic --; Lines 2, 5, and 10 replace "the PD" with -- the DO-PD --; Lines 5-7 delete the text "a passcode, a random number, a device ID of the electronic device credential, a shared secret key of the PD and the TP domain,".

Signed and Sealed this
Twelfth Day of September, 2023

Katherine Kelly Vidal
*Director of the United States Patent and Trademark Office*

In Claim 22: Column 48 Lines 30-31 replace "not within the DO-PD (TP-PD)" with -- not within the DO-PD (TP-'PD) --.

In Claim 25: Column 48 Line 37 replace "where electronic device" with -- where the electronic device --.

In Claim 28: Column 48 Lines 45-47 replace "the method further includes a second TP having a second TP domain, where the method further includes" with -- the apparatus further includes a second TP having a second TP domain, where the DO-PD is further programmed to perform the steps of --.

In Claim 30: Column 48 Line 64 replace "DO-PD (TP-PD)" with -- the DO-PD (TP-PD) --.